US012718304B2

(12) United States Patent
Grumbrecht et al.

(10) Patent No.: US 12,718,304 B2
(45) Date of Patent: Aug. 25, 2026

(54) ENVIRONMENTAL ATTRIBUTES FOR INDUSTRIAL FORMULATORS COMPOSITIONS INGREDIENTS

(71) Applicant: BASF SE, Ludwigshafen (DE)

(72) Inventors: Bastian Grumbrecht, Ludwigshafen (DE); Steffen Klosterhalfen, Ludwigshafen (DE); Christian Krueger, Ludwigshafen (DE); Ana Alba Perez, Ludwigshafen (DE); Martin Binder, Ludwigshafen (DE); Alessandro Pistillo, Ludwigshafen (DE); Christopher Alec Anderlohr, Ludwigshafen (DE); Kurt Wenzl, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 86 days.

(21) Appl. No.: 18/719,897

(22) PCT Filed: Dec. 19, 2022

(86) PCT No.: PCT/EP2022/086812
§ 371 (c)(1),
(2) Date: Jun. 14, 2024

(87) PCT Pub. No.: WO2023/118017
PCT Pub. Date: Jun. 29, 2023

(65) Prior Publication Data
US 2025/0054077 A1 Feb. 13, 2025

Related U.S. Application Data

(60) Provisional application No. 63/416,091, filed on Oct. 14, 2022.

(30) Foreign Application Priority Data

Dec. 21, 2021 (EP) .................................... 21216268
Dec. 21, 2021 (EP) .................................... 21216269
(Continued)

(51) Int. Cl.
*G06Q 50/04* (2012.01)
*G06Q 10/087* (2023.01)
*G06Q 30/018* (2023.01)

(52) U.S. Cl.
CPC ......... *G06Q 50/04* (2013.01); *G06Q 10/0877* (2025.08); *G06Q 30/018* (2013.01)

(58) Field of Classification Search
CPC ... G06Q 50/04; G06Q 10/0877; G06Q 30/018
See application file for complete search history.

(56) References Cited

U.S. PATENT DOCUMENTS

2013/0063073 A1 3/2013 Kawasaki et al.
2018/0264347 A1 9/2018 Tran et al.
(Continued)

FOREIGN PATENT DOCUMENTS

EP 2244147 A2 10/2010
EP 3550464 A1 10/2019
(Continued)

OTHER PUBLICATIONS

Beers, et al., "An Assessment of Mass Balance Accounting Methods for Polymers Workshop Report", National Institute Of Standards And Technology, Feb. 7, 2022, 47 pages.
(Continued)

*Primary Examiner* — Garcia Ade
(74) *Attorney, Agent, or Firm* — MARSHALL, GERSTEIN & BORUN LLP; William J. Samore

(57) ABSTRACT

Disclosed are systems for producing an industrial formulators composition ingredient associated with a digital asset,
(Continued)

methods for producing an industrial formulators composition ingredient associated with a digital asset, apparatuses for generating a digital asset, computer-implemented methods for generating a chemical passport, computer program elements for generating a digital asset, uses of an industrial formulators composition ingredient associated with a digital asset, uses of a digital asset, products produced from the industrial formulators composition ingredient and associated with a digital asset, a digital asset including one or more decentral identifier(s) and data related to the environmental impact data, apparatuses for producing a product associated with the digital asset and methods for producing a product associated with the digital asset.

15 Claims, 6 Drawing Sheets

(30) Foreign Application Priority Data

| Date | Office | Application No. |
|---|---|---|
| Dec. 21, 2021 | (EP) | 21216270 |
| Dec. 21, 2021 | (EP) | 21216271 |
| Dec. 21, 2021 | (EP) | 21216286 |
| Dec. 21, 2021 | (EP) | 21216292 |
| Dec. 21, 2021 | (EP) | 21216326 |
| Dec. 21, 2021 | (EP) | 21216327 |
| Dec. 21, 2021 | (EP) | 21216333 |
| Apr. 4, 2022 | (EP) | 22166573 |
| Apr. 12, 2022 | (EP) | 22167945 |
| May 10, 2022 | (EP) | 22172609 |
| May 10, 2022 | (EP) | 22172611 |
| May 10, 2022 | (EP) | 22172615 |
| May 10, 2022 | (EP) | 22172617 |
| May 10, 2022 | (EP) | 22172619 |
| Sep. 9, 2022 | (EP) | 22194793 |
| Sep. 9, 2022 | (EP) | 22194800 |
| Sep. 9, 2022 | (EP) | 22194808 |
| Sep. 9, 2022 | (EP) | 22194815 |
| Sep. 9, 2022 | (EP) | 22194818 |
| Oct. 14, 2022 | (EP) | 22201672 |
| Oct. 18, 2022 | (EP) | 22202183 |
| Dec. 5, 2022 | (EP) | 22211421 |

(56) References Cited

U.S. PATENT DOCUMENTS

| | | | | |
|---|---|---|---|---|
| 2019/0012666 | A1 | 1/2019 | Krauss et al. | |
| 2019/0043008 | A1 | 2/2019 | Vivier | |
| 2019/0342085 | A1 | 11/2019 | Kube et al. | |
| 2020/0211092 | A1 | 7/2020 | Sarin | |
| 2022/0098490 | A1* | 3/2022 | Abbott | C10G 9/00 |
| 2022/0220389 | A1 | 7/2022 | Slivensky et al. | |
| 2024/0118680 | A1* | 4/2024 | Dinkel | G05B 19/41835 |

FOREIGN PATENT DOCUMENTS

| | | | |
|---|---|---|---|
| WO | WO-2017/194976 | A1 | 11/2017 |
| WO | WO-2018/217788 | A1 | 11/2018 |
| WO | WO-2020/146230 | A1 | 7/2020 |
| WO | WO-2020/252013 | A1 | 12/2020 |

OTHER PUBLICATIONS

European Search Report for EP Patent Application No. 21216268.9, Issued on May 30, 2022 3 pages.
European Search Report for EP Patent Application No. 21216271.3, Issued on May 27, 2022 3 pages.
European Search Report for EP Patent Application No. 21216286.1, Issued on Jun. 13, 2022, 3 pages.
European Search Report for EP Patent Application No. 21216292.9, Issued on Jun. 15, 2022, 3 pages.
European Search Report for EP Patent Application No. 21216326.5, Issued on May 30, 2022 3 pages.
European Search Report for EP Patent Application No. 22166573.0, Issued on Sep. 15, 2022, 3 pages.
European Search Report for EP Patent Application No. 22167945.9, Issued on Sep. 7, 2022 3 pages.
European Search Report for EP Patent Application No. 22194793.0, Issued on Feb. 13, 2023, 3 pages.
European Search Report for EP Patent Application No. 22194800.3, Issued on Feb. 7, 2023, 3 pages.
European Search Report for EP Patent Application No. 22194808.6, Issued on Feb. 20, 2023, 3 pages.
European Search Report for EP Patent Application No. 22194815.1, Issued on Feb. 10, 2023, 3 pages.
European Search Report for EP Patent Application No. 22194818.5, Issued on Feb. 14, 2023, 3 pages.
European Search Report for EP Patent Application No. 22201672.7, Issued on Feb. 22, 2023, 3 pages.
European Search Report for EP Patent Application No. 22211421.7, Issued on May 4, 2023 , 4 pages.
International Search Report for PCT Patent Application No. PCT/EP2022/086812, Issued on Mar. 2, 2023, 3 pages.
Kalafatelis, et al., "ISLAND: An Interlinked Semantically-Enriched Blockchain Data Framework", Economics of Grids, Clouds, Systems, and Services, Dec. 9, 2021, pp. 207-214.
Naim, et al., "Knowledge Graph-Enhanced Blockchains by Integrating a Graph-Data Service-Layer", 2019 Sixth International Conference on Internet of Things: Systems, Management and Security (IOTSMS), 2019, pp. 420-427.
Oh, et al., "Enhancing Trust of Supply Chain Using Blockchain Platform with Robust Data Model and Verification Mechanisms", 2019 IEEE International Conference on Systems, Man and Cybernetics (SMC), 2019, pp. 3504-3511.
Ruta, et al., "Semantic Blockchain to Improve Scalability in the Internet of Things", Open Journal Of Internet Of Things, vol. 3, 2017, pp. 46-61.
Tewfik, et al., "New Baseline document for draft Recommendation ITU-T L.SM_B Sustainable Management of Batteries", International Telecommunication Union, Study group 5, Jul. 15, 2021, 48 pages.

* cited by examiner

ENVIRONMENTAL ATTRIBUTES FOR INDUSTRIAL FORMULATORS COMPOSITIONS INGREDIENTS

CROSS-REFERENCE TO RELATED APPLICATIONS

This is the U.S. national phase of International Application No. PCT/EP2022/086812, filed Dec. 19, 2022, which claims the benefit of:

European Patent Application No. 21216268.9, filed on Dec. 21, 2021;
European Patent Application No. 21216269.7, filed on Dec. 21, 2021;
European Patent Application No. 21216270.5, filed on Dec. 21, 2021;
European Patent Application No. 21216271.3, filed on Dec. 21, 2021;
European Patent Application No. 21216286.1, filed on Dec. 21, 2021;
European Patent Application No. 21216292.9, filed on Dec. 21, 2021;
European Patent Application No. 21216326.5, filed on Dec. 21, 2021;
European Patent Application No. 21216327.3, filed on Dec. 21, 2021;
European Patent Application No. 21216333.1, filed on Dec. 21, 2021;
European Patent Application No. 22166573, filed on Apr. 4, 2022;
European Patent Application No. 22167945.9, filed on Apr. 12, 2022;
European Patent Application No. 22172609.4, filed on May 10, 2022;
European Patent Application No. 22172611, filed on May 10, 2022;
European Patent Application No. 22172615.1, filed on May 10, 2022;
European Patent Application No. 22172617.7, filed on May 10, 2022;
European Patent Application No. 22172619.3, filed on May 10, 2022;
European Patent Application No. 22194793, filed on Sep. 9, 2022;
European Patent Application No. 22194800.3, filed on Sep. 9, 2022;
European Patent Application No. 22194808.6, filed on Sep. 9, 2022;
European Patent Application No. 22194815.1, filed on Sep. 9, 2022;
European Patent Application No. 22194818.5, filed on Sep. 9, 2022;
European Patent Application No. 22201672.7, filed on Oct. 14, 2022;
U.S. Provisional Patent Application No. 63/416,091, filed on Oct. 14, 2022;
European Patent Application No. 222021; 83.4, filed on Oct. 18, 2022; and
European Patent Application No. 22211421.7, filed on Dec. 5, 2022.

TECHNICAL FIELD

The present disclosure relates to systems for producing an industrial formulators composition ingredient associated with an industrial formulators composition ingredient passport or digital asset, methods for producing an industrial formulators composition ingredient associated with an industrial formulators composition ingredient passport or digital asset, apparatuses for generating a passport or digital asset associated with a industrial formulators composition ingredient, computer-implemented methods for generating a industrial formulators composition ingredient passport or digital asset, computer program elements for generating an industrial formulators composition ingredient passport or digital asset, uses of an industrial formulators composition ingredient associated with an industrial formulators composition ingredient passport or digital asset, uses of an industrial formulators composition ingredient passport or digital asset, products produced from the industrial formulators composition ingredient and associated with an industrial formulators composition ingredient passport or digital asset, a industrial formulators composition ingredient, an industrial formulators composition ingredient passport or digital asset including one or more decentral identifier(s) and data related to environmental impact data, apparatuses for producing a product associated with the industrial formulators composition ingredient passport or digital asset and methods for producing a product associated with the industrial formulators composition ingredient passport or digital asset.

TECHNICAL BACKGROUND

In supply chains the environmental impact of each supply chain participants is of great interest. Specifically in the field of chemistry, industrial formulators composition ingredients are employed for a wide range of applications and are supplied to diverse value chains. In such complex systems transparency between value chain participants is hard to achieve.

SUMMARY OF THE INVENTION

In one aspect disclosed is a system for producing an industrial formulators composition ingredient associated with an industrial formulators composition ingredient passport or a digital asset, the system comprising:

a chemical production network configured to produce the industrial formulators composition ingredient wherein the industrial formulators composition ingredient is produced from one or more input material(s) through one or more chemical process(s) of the chemical production network, wherein the one or more input material(s) and/or the one or more chemical process(s) are associated with environmental attribute(s);

a production operating apparatus configured to generate the industrial formulators composition ingredient passport or digital asset by providing a decentral identifier associated with the produced industrial formulators composition ingredient and the one or more environmental attribute(s) of the one or more input material(s) and/or the one or more chemical process(s);

linking the decentral identifier and the environmental attribute(s);

optionally the chemical production network or system configured to provide the produced industrial formulators composition ingredient in association with the industrial formulators composition ingredient passport or digital asset.

In another aspect disclosed is a system for producing an industrial formulators composition ingredient associated with an industrial formulators composition ingredient passport or digital asset, the system comprising:

a chemical production network configured to produce the industrial formulators composition ingredient from one or more input material(s) through chemical process(s), wherein the one or more input material(s) and/or the chemical process(s) are associated with environmental attribute(s);

a production operating apparatus configured to generate the industrial formulators composition ingredient passport or digital asset by providing and/or linking a decentral identifier associated with the industrial formulators composition ingredient and one or more environmental attribute(s) associated with the one or more input material(s) and/or the chemical process(s).

In another aspect disclosed is a method for producing an industrial formulators composition ingredient associated with an industrial formulators composition ingredient passport or digital asset, wherein the method comprises:

producing the industrial formulators composition ingredient from one or more input material(s) through one or more chemical process(s) of a chemical production network, wherein the one or more input material(s) and/or the one or more chemical process(s) are associated with environmental attribute(s);

generating the industrial formulators composition ingredient passport or digital asset by providing a decentral identifier associated with the produced industrial formulators composition ingredient and one or more environmental attribute(s) associated with the one or more input material(s) and/or the one or more chemical process(s); linking the decentral identifier and the one or more environmental attribute(s);

providing the produced industrial formulators composition ingredient in association with the industrial formulators composition ingredient passport or digital asset.

In another aspect disclosed is a method for producing an industrial formulators composition ingredient associated with an industrial formulators composition ingredient passport or a digital asset, wherein the method comprises:

producing the industrial formulators composition ingredient from one or more input material(s) through one or more chemical process(s) of a chemical production network, wherein the one or more input material(s) and/or the one or more chemical process(s) are associated with environmental attribute(s), generating the industrial formulators composition ingredient passport or digital asset by providing and/or linking a decentral identifier associated with the industrial formulators composition ingredient and one or more environmental attribute(s) of the one or more input material(s) and/or the chemical process(s).

In another aspect disclosed is an apparatus for generating a passport or digital asset associated with an industrial formulators composition ingredient, wherein the industrial formulators composition ingredient is produced from one or more input material(s) through one or more chemical process(s) of a chemical production network, wherein the one or more input material(s) and/or the one or more chemical process(s) are associated with environmental attribute(s), the apparatus comprising:

a decentral identity provider configured to provide a decentral identifier associated with the produced industrial formulators composition ingredient and one or more environmental attribute(s) of the one or more input material(s) and/or the one or more chemical process(s) used to produce the industrial formulators composition ingredient;

an assignor configured the decentral identifier and the environmental attribute(s);

a passport provider configured to provide the industrial formulators composition ingredient passport or digital asset in association with the produced industrial formulators composition ingredient to a decentral network, wherein the environmental attribute(s) associated with the industrial formulators composition ingredient is made accessible to a consumer of the industrial formulators composition ingredient through the industrial formulators composition ingredient passport or digital asset.

In another aspect disclosed is a method, e.g. a computer-implemented method, for generating an industrial formulators composition ingredient passport or digital asset associated with an industrial formulators composition ingredient, wherein the industrial formulators composition ingredient is produced from one or more input material(s) through one or more chemical process(s) of a chemical production network, wherein the one or more input material(s) and/or the one or more chemical process(s) are associated with environmental attribute(s), the method comprising:

providing a decentral identifier associated with the produced industrial formulators composition ingredient and one or more environmental attribute(s) of the one or more input material(s) and/or the one or more chemical process(s) used to produce the industrial formulators composition ingredient;

linking the decentral identifier and the environmental attribute(s);

providing the industrial formulators composition ingredient passport or digital asset in association with the produced industrial formulators composition ingredient to a decentral network, wherein the environmental attribute(s) associated with the industrial formulators composition ingredient is made accessible to a user of the industrial formulators composition ingredient through the industrial formulators composition ingredient passport or digital asset.

In another aspect disclosed is a computer element, such as a computer readable storage medium, a computer program or a computer program product, comprising instructions, which when executed by a computing node or a computing system, direct the computing node or computing system to carry out the steps of the computer-implemented methods disclosed herein.

In another aspect disclosed is a computer element, such as a computer readable storage medium, a computer program or a computer program product, comprising instructions, which when executed by the apparatuses disclosed herein, direct the apparatuses to carry out steps the apparatuses disclosed herein are configured to execute.

In another aspect disclosed is a industrial formulators composition ingredient associated with an industrial formulators composition ingredient passport or a digital asset as produced according to the methods disclosed herein. In another aspect disclosed is an industrial formulators composition ingredient associated with an industrial formulators composition ingredient passport or digital asset as produced according to the systems disclosed herein.

In another aspect disclosed is a industrial formulators composition ingredient associated with an industrial formulators composition ingredient passport or digital asset, wherein the industrial formulators composition ingredient is produced from one or more input material(s) through one or more chemical process(s) of a chemical production network, wherein the one or more input material(s) and/or the one or more chemical process(s) are associated with environmental attribute(s), wherein the industrial formulators composition ingredient passport or digital asset includes a decentral identifier associated with the produced industrial formulators composition ingredient and a link to environmental attribute(s) associated with one or more environmental attribute(s) of one or more input material(s) and/or one or more chemical process(s) used to produce the industrial formulators composition ingredient.

In another aspect disclosed is a industrial formulators composition ingredient passport or digital asset as generated according to the methods disclosed herein. In another aspect disclosed is an industrial formulators composition ingredient passport or digital asset as generated according to the apparatuses disclosed herein.

In another aspect disclosed is a production system for producing a product from the industrial formulators composition ingredient associated with the industrial formulators composition ingredient passport or digital asset as provided according to the systems, apparatuses or methods disclosed herein. In another aspect disclosed is a production method for producing a product from the industrial formulators composition ingredient associated with the industrial formulators composition ingredient passport or digital asset as provided according to the systems, apparatuses or methods disclosed herein.

In another aspect disclosed is a use of the industrial formulators composition ingredient associated with the industrial formulators composition ingredient passport or digital asset as disclosed herein for producing a product from the industrial formulators composition ingredient associated with the industrial formulators composition ingredient passport or digital asset.

In another aspect disclosed is a use of the industrial formulators composition ingredient passport or digital asset as disclosed herein for generating a product passport or digital asset associated with a product produced from the industrial formulators composition ingredient associated with the industrial formulators composition ingredient passport or digital asset. In another aspect disclosed is a method for using the digital asset generated according to the methods disclosed herein in the production of a product produced from the industrial formulators composition ingredient associated with the industrial formulators composition ingredient passport or digital asset.

In another aspect disclosed is a industrial formulators composition ingredient associated with a digital asset including a decentral identifier associated with the industrial formulators composition ingredient and linked to one or more environmental attribute(s) of the one or more input material(s) and/or the one or more chemical process(s) used to produce the industrial formulators composition ingredient.

In another aspect disclosed is a use of the industrial formulators composition ingredient associated with the industrial formulators composition ingredient passport or digital asset for producing a product from the industrial formulators composition ingredient and associating the industrial formulators composition ingredient passport or digital asset with the product produced from the industrial formulators composition ingredient. In another aspect disclosed is a use of the industrial formulators composition ingredient associated with the industrial formulators composition ingredient passport or digital asset for producing a product from the industrial formulators composition ingredient and deriving a product passport or digital asset from the industrial formulators composition ingredient passport or digital asset. In another aspect disclosed is a method for using the industrial formulators composition ingredient associated with the digital asset for producing a product from the industrial formulators composition ingredient as disclosed herein and deriving a digital asset associated with the product from the industrial formulators composition ingredient passport or digital asset.

Any disclosure and embodiments described herein relate to the methods, the systems, chemical products, industrial formulators composition ingredient, industrial formulators composition ingredient passports or digital assets and the computer elements lined out above and below. Advantageously, the benefits provided by any of the embodiments and examples equally apply to all other embodiments and examples.

EMBODIMENTS

In the following, embodiments of the present disclosure will be outlined by ways of embodiments and/or example. It is to be understood that the present disclosure is not limited to said embodiments and/or examples.

Determining, generating includes initiating or causing to determine, generate. Providing includes "initiating or causing to access, determine, generate, send or receive". "Initiating or causing to perform an action" includes any processing signal that triggers a computing node to perform the respective action.

The methods, the systems, industrial formulators composition ingredients, industrial formulators composition ingredient passports or digital assets and the computer elements disclosed herein provide an efficient, secure and robust way for sharing or exchanging environmental impact data across different participant nodes in value chains. In particular, by providing industrial formulators composition ingredient specific data via the industrial formulators composition ingredient passport or digital asset, environmental impacts can be shared and made transparent from the industrial formulators composition ingredient to the product produced from such industrial formulators composition ingredient. The industrial formulators composition ingredient passport or digital asset enables secure data exchange, since data access can be controlled by the industrial formulators composition ingredient provider, e.g. the entity providing the industrial formulators composition ingredient. The exchanged data assets can be specific to the industrial formulators composition ingredient as produced and tailored to the needs of the consumer of the industrial formulators composition ingredient. This way an improved tracking and tracing of industrial formulators composition ingredients can be achieved by securely providing environmental impact data in diverse and highly complex value chains. The environmental impact of industrial formulators composition ingredient can hence be tracked leading to simpler, more efficient and sustainable handling of industrial formulators composition ingredient by value chain participants.

Industrial formulators compositions typically comprise various ingredients for different purposes. Industrial formulators composition ingredients include, without being limited to, chemical products used in the construction industry, in the agrochemical industry, in coatings and adhesives, in sealants and elastomers, in the pulp and paper industry, in bioprocessing, and in the textile and leather industry.

Industrial formulators composition ingredients associated with the industrial formulators composition ingredients passport or digital asset include, without being limited to, macromonomers, polymers of acrylic acid and/or methacrylic acid and their alkali metal or ammonium salts, non-ionic surfactants, solvents, wetting agents, adjuvants, anionic surfactants, emulsifiers, dispersants for pigments, macromers for silicone surfactants, defoamers, adhesion promoters, processing aids, cross-linking catalysts, bleach stabilisers, retention aids, barrier coatings, binders, biocatalysts, micronutrients, cell breakers, treatment aids, mercering products, oligomeric dispersants, dye transfer inhibitors, and bleach stabilisers.

Construction Industry

Industrial formulators composition ingredients include chemical products used in the construction industry. Chemical products used in the construction industry include i) macromonomers, typically ethylenically unsaturated polyalkoxylates, such as isoprenyl polyethylene glycols, for instance Pluriol® A 1190 I, and hydroxy butyl-vinyl-polyethylene glycols, for instance Pluriol® A 3090 V; other macromonomers, typically end capped polyalkylene glycols, such as alkyl polyethylene glycols, e.g. methyl polyethylene glycols, for instance Pluriol® A 1020 E; ii) polymeric backbones for synthesis of functionalised polymers which may have functionality for instance as plasticisers for construction materials including concrete, typically polymers of acrylic acid and/or methacrylic acid and their respective alkali metal or ammonium salts, for instance of weight average molecular weights (MW) 5000-20,000 g/mol, for instance Sokalan® PA 25 XS, which can be functionalised by esterification, for instance by polyalkylene glycols; iii) defoamers for concrete, typically non-ionic surfactants, including polyalkylene glycols or polyalkylene glycol block polymers, such as alkoxylated fatty alcohols, such as alkyl-EO-PO block polymers or hydroxy alkyl-EO-PO block copolymers, for instance Plurafac® LF 1300; or PO-EO-PO block copolymers with molar mass in the range from 800 to 3500 g/mol, typically Pluronic® PE 8100.

Agrochemical Industry

Industrial formulators composition ingredients include chemical products used in the agrochemical industry. Chemical products used in the agrochemical industry include i) solvents, typically fatty acid dialkylamides, suitably fatty acid diethylamides but preferably fatty acid dimethylamides, suitably N, N-dimethyl C8-12 amides, for instance Agnique® AMD 810, Agnique® AMD 10 and Agnique® AMD 12, and other solvents including alkyl esters of vegetable fatty acids, such as methyl esters of vegetable fatty acids; ii) wetting agents/adjuvants, typically alkyl polyglucosides, for instance Agnique® PG 8105-G and Agnique® PG 8107-G; iii) emulsifiers/adjuvants, typically non-ionic surfactants mainly polyethers and alkyl polyethers, usually polyalkylene glycols and end capped polyalkylene glycols, such as alkoxylated fatty alcohols, such as alkyl-EO-PO block copolymers or hydroxy alkyl-EO-PO block copolymers for instance in the Plurafac® range, or PO-EO-PO block copolymers with molar mass in the range from 800 to 3500 g/mol, for instance in the Pluronic® range; and typically anionic surfactants such as alkyl ether sulfates, often fatty alcohol ether sulfates.

Coatings and Adhesives

Industrial formulators composition ingredients include chemical products used in coatings and adhesives. Chemical products used in coatings and adhesives include i) primary emulsifiers for dispersions, typically anionic surfactants, for instance alkyl ether sulfates, often fatty alcohol ether sulfates, for instance Disponil® FES 27; ii) secondary emulsifiers for dispersions, typically non-ionic surfactants, for instance alkyl polyethers, typically linear fatty alcohol ethoxylates, such as Disponil® A 3065; iii) dispersants for pigments in slurries and dispersions, generally polymers of ethylenically unsaturated mono- or dicarboxylic acids, typically poly (meth-) acrylates, for instance homopolymers of acrylic acid and alkali metal, alkaline earth metal or ammonium salts thereof, for instance sodium salts of polyacrylic acid or sodium calcium bineutralised polyacrylic acid, including low molecular weight and/or narrow molecular weight distribution polymers of acrylic acid, suitably having weight average molecular mass (MW) from 1000 to 20,000 g/mol, optionally 1000 to 5000 g/mol, optionally 1000 to 3500 g/mol, optionally 1000 to 2000 g/mol, and/or having a molecular weight polydispersity index (PDI) from 1.05 to 2.2, for instance 1.1 to 2.0, optionally 1.1 to 1.8, optionally 1.1 to 1.5, including polyacrylic acids and their salts produced using chain transfer agents, particularly sodium hypophosphite, for instance Sokalan® CP10, Sokalan® NR 2000, Sokalan® NR 2555 and Sokalan® NR 25 BN; iv) macromers for silicone surfactants, including ethylenically unsaturated polyethers and ethylenically unsaturated polyether block copolymers, for instance allyl polyalkylene oxides and allyl polyalkylene oxide block copolymers, for instance allyl alcohol ethoxylates, typically allyl-EO-PO block copolymers, such as Pluriol® A 10 R; v) defoamers in coatings, generally polyalkylene glycols, typically polypropylene glycol optionally having a weight average molecular weight (MW) from 500 to 1500 g/mol, optionally 750 to 1100 g/mol, for instance Pluriol® P900; vi) adhesion promoters for adhesive systems, for instance adhesive systems for rubber composites, including polyalkyleneimines, typically linear or preferably branched polyethyleneimines, optionally having a weight average molecular weight (MW) from 500 to 10,000 g/mol, optionally from 800 to 5000 g/mol, typically from the Lupasol® range, and modified analogous polyethyleneimines.

Sealants and Elastomers

Industrial formulators composition ingredients include chemical products used in sealants and elastomers. Chemical products used in sealants and elastomers include i) processing aids in tyre manufacturing, such as water-soluble silicates, typically alkali metal silicates, particularly the sodium and potassium salts; polyethers, suitably polyalkylene glycols or alkyl end capped polyalkylene glycols, suitably polyethylene glycols, for instance Pluriol® E 4000 and Pluriol® E 8000; typically fatty acid dialkylamides, suitably fatty acid diethylamides but preferably fatty acid dimethylamides, suitably N,N-dimethyl C8-12 amides, for instance Agnique® AMD 810, Agnique® AMD 10 and Agnique® AMD 12; ii) processing aids in S-SBR rubber polymerisation processes, typically copolymers of olefins and ethylenically unsaturated carboxylic acids, suitably olefins and ethylenically unsaturated dicarboxylic acids and their anhydrides, preferably copolymers of diisobutylene/maleic acid copolymers, for instance Sokalan® CP 9; iii) basic cross-linking catalysts for use in rubber, typically polyalkyleneimines, for instance polyethyleneimines, optionally linear polyethyleneimines or preferably branched polyethyleneimines, for instance of the Lupasol® range; iv) cross-linkers for use in polyurethanes, typically derivatives of alkoxylates, for instance trimethylol propane alkoxylates, or glycerine alkoxylates, for instance Pluriol® A3 TE and Pluriol® A4 TE.

Pulp and Paper Industry

Industrial formulators composition ingredients include chemical products used in the pulp and paper industry. Chemical products for use in the pulp and paper industry include i) bleach stabilisers for pulp, including sequestering agents, for instance ethylenediaminetetraacetic acid (EDTA), including salts thereof, typically alkali metal salts, suitably sodium salts, and dicarboxy methyl alaninate (MGDA), including salts thereof, typically alkali metal salts, suitably sodium salts, including Trilon® B, Trilon® BX and Trilon® M; bleach stabilisers such as water-soluble silicates, for instance alkali metal silicates, such as sodium or potassium silicates, for instance Hyporan® A; ii) dispersants for white pigments as fillers for coating of paper, generally polymers of ethylenically unsaturated mono- or di-carboxylic acids, typically poly (meth-) acrylates, for instance homopolymers of acrylic acid and alkali metal, alkaline earth metal or ammonium salts thereof, for instance sodium salts of polyacrylic acid or sodium calcium bineutralised polyacrylic acid, including low molecular weight and/or narrow molecular weight distribution polymers of acrylic acid, suitably having weight average molecular mass (MW) from 1000 to 20,000 g/mol, optionally 1000 to 5000 g/mol, optionally 1000 to 3500 g/mol, optionally 1000 to 2000 g/mol, and/or having a molecular weight polydispersity index (PDI) from 1.05 to 2.2, for instance 1.1 to 2.0, optionally 1.1 to 1.8, optionally 1.1 to 1.5, including polyacrylic acids and their salts produced using chain transfer agents, particularly sodium hypophosphite, for instance Sokalan® CP10, Sokalan® NR 2000, Sokalan® NR 2555, Sokalan® NR 2595 and Sokalan® NR 25 BN; iii) retention aids in papermaking, including polyalkyleneimines, typically linear or preferably branched polyethyleneimines, optionally having a weight average molecular weight (MW) from 500 to 10,000 g/mol, optionally from 800 to 5000 g/mol, typically Lupasol® SK; iv) barrier coatings for packaging board, for instance water-soluble silicates, such as alkali metal silicates, for instance sodium silicate or potassium silicate, including the Trasol® product range; v) binders for cardboard/packaging including water-soluble silicates, such as alkali metal silicates, for instance sodium silicate or potassium silicate, including the Trasol® product range.

Bioprocessing

Industrial formulators composition ingredients include chemical products used in bioprocessing. Chemical products for use in bioprocessing include i) biocatalysts for biodiesel, for instance alkyl sulfonic acids, suitably methane sulfonic acid, such as Lutropur® MSA; ii) processing aids for increasing the yield in second-generation bio ethanol production, for instance polyalkylene glycols and alkyl end capped polyalkylene glycols, typically polyethylene glycols and alkyl end capped polyethylene glycols, for instance Pluriol® E 6000 E; iii) processing aids in fermentation, typically polyalkylene glycols, typically alkylene oxide block copolymers, such as EO-PO block copolymers, such as Pluronic® PE 6400; iv) micronutrients in fermentation processes, for instance metal complexes of EDTA, for instance Libfer® and Chaufer® product ranges; v) cell breaking in fermentation, including alkyl ether sulfates.

Textile and Leather Industry

Industrial formulators composition ingredients include chemical products used in the textile and leather industry. Chemical products for use in the textile and leather industry include i) non-ionic surfactants emulsified silicone oils, degreasing of cotton and degreasing of raw hides, for instance polyethers or alkyl polyethers, such as alkyl end capped polyalkylene glycols, typically polyethylene glycols, alkyl end capped polyethylene glycols, polypropylene glycols, alkyl end capped polypropylene glycols and alkyl ether PO-EO block copolymers, including products from the Lutensol® TO product range; ii) treatment aids in leather processing, including alkyl sulfonic acids, typically methane sulfonic acid, such as Lutropur® MSA; iii) products for mercering of cotton or degreasing of cotton, for instance alkyl sulfates, such as 2-ethylhexyl sulfates, for example Disponil® EHS 47; iv) polyester oligomeric dispersants, typically poly (meth-) acrylates, for instance polymethacrylates or polyacrylates, such as copolymers of acrylic acid and methacrylic acid, for example Sokalan® CP5; v) dye transfer inhibitors, suitably any of polyvinyl imidazole or polyalkyleneimines, including polyethyleneimines, for example functionalised polyethyleneimines, such as multi-functionalised polyethyleneimines, particularly alkoxylated polyethyleneimines, especially ethoxylated polyethyleneimines, for example for instance Sokalan® HP20; vi) bleach stabilisers for cotton, including sequestering agents, for instance ethylenediaminetetraacetic acid (EDTA), including salts thereof, typically alkali metal salts, suitably sodium salts, and dicarboxy methyl alaninate (MGDA), including salts thereof, typically alkali metal salts, suitably sodium salts, including Trilon® B and Trilon® M.

The chemical production network may include one or more one or more chemical and/or mechanical process(es). The chemical production network may produce one or more output material(s) through chemical and/or mechanical processing. The chemical production network may include multiple types of production processes for producing one or more output material(s) from one or more input material(s). The chemical production network may produce one or more output material(s) from input material(s) provided to the chemical production network. The chemical production network may include a complex production network producing multiple chemical products via multiple production process(es). The chemical production network may include connected, interconnected and/or non-connected production process(es). The chemical production network may include a composite or Verbund network.

The chemical production network may include identity preserving or segregated production process(es). Identity preserving or segregated in this context may refer to environmental attribute(s) of input material(s) being preserved or segregated in the production process(es). Examples are non-fossil, e.g. renewable or recycled, input materials used to produce the one or more industrial formulators composition ingredient(s) without fossil content. Further examples are fossil input material(s) used to produce the one or more industrial formulators composition ingredient(s) with fossil content. Chemical production networks may include non-identity preserving or non-segregated production process (es). Non-identity preserving or non-segregated in this context may refer to non-fossil input material(s) being mixed with fossil input material(s) to produce the industrial formulators composition ingredient(s). For example, fossil and renewable input materials may be mixed to produce the industrial formulators composition ingredient(s) with fossil and renewable content.

The chemical production network may include one or more production process(es) with multiple production steps. The production steps included in the chemical network may be defined by the physical system boundary of the chemical production network. The system boundary may be defined by location and/or control over production processes or steps. The system boundary may be defined by a site of the chemical production network. The system boundary may be defined by production process(es) or step(s) controlled by one entity or multiple entities jointly. The system boundary may be defined by the value chain with staggered production process(es) or step(s) to the chemical end product, which may be controlled by multiple entities jointly or separately. The chemical production network may include a waste collection, a sorting step, a recycling step such as pyrolysis, a cracking step such as steam cracking, a separation step to separate intermediates of one process step and further processing steps to convert such intermediates to output material(s), in particular the produced industrial formulators composition ingredient(s) leaving the system boundary of the chemical production network. The input material(s) may enter the physical system boundary of the chemical production network. The entry point(s) of the chemical production network may be marked by the entry of input material(s) to the chemical production network or the system boundary of the chemical network. The output material(s), in particular the produced industrial formulators composition ingredient(s), may leave the physical system boundary of the chemical production network. The exit point(s) of the chemical production network may be marked by the exit of output material(s), in particular the produced industrial formulators composition ingredient(s), from the chemical production network or the system boundary of the chemical network.

The chemical production network may include one or more production chain(s) for the production of industrial formulators composition ingredients. The production chain(s) for the production of industrial formulators composition ingredients may be interconnected. The production chain(s) for the production of industrial formulators composition ingredients may be interconnected with production chain(s) for the production of other output material(s). The production chain(s) for the production of industrial formulators composition ingredients may include production chain(s) for the production of intermediates used to produce industrial formulators composition ingredients. The production chain(s) for the production of industrial formulators composition ingredients may use input material(s) provided by chemical network(s) for the production of intermediates usable to produce industrial formulators composition ingredients.

One or more input material(s) may be provided to the chemical production network for producing one or more output material(s), in particular industrial formulators composition ingredient(s). The output material(s), in particular industrial formulators composition ingredient(s), may be produced from one or more input material(s) through one or more chemical process(s) of the chemical production network. The input material may comprise any input material entering the chemical production network at any entry point. The input material may include organic or inorganic input material(s). The input material may be a pre-cursor product, an intermediate material, a feedstock or a raw material used to produce one or more output material(s), in particular industrial formulators composition ingredient(s). The input material may be fed to the chemical production network to produce one or more output material(s), in particular industrial formulators composition ingredient(s). The input material may be fed to chemical production network including one or more production process(es) with multiple process steps. The input material may be fed to the chemical production network at the start of the production process or at any intermediate stage of the production process. The input materials entering the chemical production network may be used to produce one or more output material(s), in particular industrial formulators composition ingredient(s).

The input material may be associated with an input material identifier. The input material identifier may comprise any identifier uniquely associated with the input material. The input material identifier may be associated with the physical entity of the input material. The input material identifier may be associated with a single batch of input material. The input material identifier may be associated with a group of input materials. The identifier may be associated with multiple physical entities of the input material. The input material identifier may be associated with continuous or semi-continuous stream of input material. The input material identifier may be associated with a stream of the input material e.g. over a certain time period or from a certain supplier. The input material identifier may be linked or connected to one or more environmental attribute(s).

Environmental attribute may refer to a property related to the environmental impact. Such property may be the property of input material(s), chemical process(es), chemical production network(s) and/or industrial formulators composition ingredient(s). The environmental attribute may indicate an environmental performance of input material(s), chemical process(es), chemical production network(s) and/or industrial formulators composition ingredient(s). The environmental attribute may be derived from properties of input material(s), chemical process(es), chemical production network(s) and/or industrial formulators composition ingredient(s). The environmental attribute may be associated with the environmental impact of input material(s), chemical process(es), chemical production network(s) and/or industrial formulators composition ingredient(s) at any stage of the lifecycle of the input material(s) and/or industrial formulators composition ingredient(s). The stages may include providing raw material, providing feedstock, producing chemical products, such as intermediate products or end products, producing discrete products by using the chemical products, using chemical products or discrete products, treating end-of-life products, recycling end-of-life products, disposing end-of-life products, reusing components from end-of-life products or any subset of stages. The environmental attribute may be specified or may be derived from any activity of one or more entities participating at any stage of the lifecycle of one or more material(s) or product(s).

The environmental attribute may include one or more characteristic(s) that are attributable to environmental impact of input material(s), chemical process(es), chemical production network(s) and/or industrial formulators composition ingredient(s). The environmental attribute may include environmental, technical, recyclability or circularity characteristics(s) associated with the environmental impact of input material(s), chemical process(es), chemical production network(s) and/or industrial formulators composition ingredient(s).

The environmental attribute may include one or more characteristic(s) that are attributable to the environmental impact of input material(s), chemical process(es), chemical production network(s) and/or industrial formulators composition ingredient(s). The environmental attribute may include environmental, technical, recyclability or circularity characteristics(s) associated with the environmental impact of input material(s), chemical process(es), chemical production network(s) and/or industrial formulators composition ingredient(s). The one or more environmental attribute(s) may be attributable to the environmental impact of the industrial formulators composition ingredient. The one or more environmental attribute(s) may relate to environmental, technical, recyclability, circularity and/or complementary risk characteristic(s) of the industrial formulators composition ingredient.

Environmental characteristic(s) may specify or quantify ecological criteria associated with environmental impact. Environmental characteristic(s) may be or may be derived from measurements taken during the lifecycle. Environmental characteristics may be determined at any stage of the lifecycle and may characterize the environmental impact for such stage or up to such stage. Environmental characteristic(s) may for example include carbon footprint, greenhouse gas emissions, resource usage, air emissions, ozone depletion potential, water pollution, noise pollution, energy consumption, waste reduction, or eutrophication potential. Environmental characteristic(s) may for example include product characteristics related to the production of the product like bio based, vegetable based, animal based, halogen-free, fluorine-free, vegan, halal, kosher, palm oil-free, natural, tox-fee, volatile organic compounds-free or any combinations thereof.

Technical characteristic(s) may specify or quantify performance at least indirectly associated with the environmental impact. Technical characteristic(s) may be or may be derived from measurements taken during the lifecycle. Technical characteristics may be determined at any stage of the lifecycle and may characterize the performance for such stage or up to such stage. Technical characteristic(s) may for example include chemical composition data, raw material composition such as bio-based or recycled input material content specifying e.g. x % non fossil and y % fossil content, bill of materials, product specification data such as product purity, product form (as indication to their impact on dust formation/release), safety data, product extractability, migration data, toxicological data or ecotoxicological data, product component data, safety data, application property data, application instructions, quality data or any combinations thereof.

Circularity characteristic(s) may specify or quantify the life cycle characteristics associated with circular uses. Circularity characteristic(s) may be or may be derived from measurements taken during the lifecycle. Circularity characteristic(s) may be or may be derived from circular data recorded in one or more prior lifecycle(s) including reuse. Circularity characteristic(s) may be determined at any stage of the lifecycle and may characterize the reuse or recycling performance for such stage or up to such stage. Circularity characteristic(s) may for example include recycling data, reuse rate, recycling rate, recycling loops, reuse performance, reused quality or any combinations thereof.

Recyclability characteristic(s) may specify or quantify life cycle characteristics associated with recycling uses. Recyclability characteristic(s) may include the composition of the material including specifically tailored constituents making the material suitable for recycling. Recyclability characteristic(s) may be or may be derived from measurements taken during the lifecycle. Recyclability characteristic(s) may be or may be derived from recycling data recorded in one or more prior lifecycle(s). Recyclability characteristics may be determined at any stage of the lifecycle and may characterize the recycling performance for such stage or up to such stage. Recyclability characteristic(s) may for example include recycling data, number of reuses, recyclate composition, recyclate quality, waste stream composition, waste stream quality or any combinations thereof.

In one embodiment the industrial formulators composition ingredients passport or digital asset associated with the industrial formulators composition ingredient may include mass balanced environmental attributes related to the input material. Mass balanced environmental attributes may include environmental attributes of the input material(s) used to produce the industrial formulators composition ingredient, which are tracked and by mass attributable to the industrial formulators composition ingredient. The environmental impact of input material(s) may be determined based on input material(s) used in the chemical process(s) to produce the industrial formulators composition ingredient. For example, bio-based, renewable and/or recycled content of input material(s) used to produce the industrial formulators composition ingredient may be tracked. Further for example, castor oil or palm oil content of input material(s) used to produce the industrial formulators composition ingredient may be tracked.

Further for example, castor oil or palm oil content of input material(s) used to produce the industrial formulators composition ingredient may be tracked. Further for example, properties related to the environmental impact of the input material include RSPO palm oil, palm oil free or castor oil may be tracked. Further for example, properties of the chemical process(es) used to produce the industrial formulators composition ingredient may be tracked. Examples of tracked process properties related to the environmental impact include water consumption, $CO_2$ emissions and/or Greenhouse Gas (GHG) emissions, amount of waste generation, mixed material generation, design for recycling, energy consumption, processing properties such as less waste or less loss of properties. The properties may be tracked based on a certificate from a certifying agency. The properties may be tracked based on inherent physical properties derived from measurements.

In one embodiment the produced industrial formulators composition ingredient is connected to the decentral identifier physically identifying the produced industrial formulators composition ingredient. The production operating apparatus may be configured to provide the decentral identifier associated with a physical entity of the produced industrial formulators composition ingredient. The production operating apparatus may be configured to link the decentral identifier to a physical identifier of the produced industrial formulators composition ingredient. The production operating apparatus may be configured to assign the decentral identifier to the physical identifier connected to the produced industrial formulators composition ingredient. The production operating apparatus may be configured to assign the decentral identifier to the physical identifier physically connected to the produced industrial formulators composition ingredient.

In one embodiment the decentral identifier relates to data associated with at least one product produced from the industrial formulators composition ingredient, wherein the one or more environmental attribute(s) associated with the at least one product is derived from one or more environmental attribute(s) associated with the industrial formulators composition ingredient. The one or more environmental attribute(s) associated with the industrial formulators composition ingredient may be associated with the one or more input material(s) and/or the chemical process(s) used to produce the industrial formulators composition ingredient. The decentral identifier may relate to any identifier uniquely associated with the industrial formulators composition ingredient. The decentral identifier may be associated with the physical entity of the industrial formulators composition ingredient. The decentral identifier may refer to a single batch of industrial formulators composition ingredient. The decentral identifier may be associated with a group of industrial formulators composition ingredients. The identifier may refer to multiple physical entities of the industrial formulators composition ingredient. The decentral identifier may be associated with continuous or semi-continuous stream of industrial formulators composition ingredient. The identifier may refer to a stream of the industrial formulators composition ingredient e.g. over a certain time period or from a certain supplier.

In one embodiment the one or more environmental attribute(s) associated with the industrial formulators composition ingredient(s) are provided from at least one balancing account configured to store environmental attribute(s) associated with input material(s). The balancing account may relate to storage structure associated with metadata, such as an environmental attribute type. For instance, the balancing account may be associated with metadata indicating the environmental attribute type to be recycled-content or bio-based. An inbound allocator may be configured to allocate the one or more environmental attribute(s) associated with input material(s) to at least one balancing account e.g. on entry of the input material to the chemical production network. The balancing account may be associated with the respective environmental attribute type. An outbound assigner may be configured to assign at least one environmental attribute from the at least one balancing account associated with the respective environmental attribute to the decentral identifier. One or more environmental attribute(s) may be assigned to the at least one decentral identifier. Assignment may include de-allocation of the one or more environmental attributes from the balancing account associated with the respective environmental attribute type. By using the balancing accounts environmental attributes of input materials can be reliably tracked and assigned to industrial formulators composition ingredients.

In one embodiment the one or more environmental attribute(s) associated with the industrial formulators composition ingredient(s) are provided from at least one balancing account configured to store environmental attribute(s) associated with input material(s). An inbound allocator may be configured to allocate the one or more environmental attribute(s) to at least one balancing account associated with the respective environmental attribute, e.g. on input material entering the chemical production network. The balancing account may be associated with the respective environmental attribute type. The one or more environmental attribute(s) associated with the input materials may be allocated to the balancing account associated with the respective environmental attribute type. An outbound assigner may be configured to assign or link at least one environmental attribute from the at least one balancing account associated with the respective environmental attribute type to the decentral identifier. This may include de-allocation of the one or more environmental attribute(es) from the balancing account associated with the respective environmental attribute type. By using the balancing accounts environmental attributes can be tacked through the chemical production network. This way the environmental attributes may be detached from the material flow. Attribution of environmental attribute(s) may be conducted on a mass balance basis for the chemical production network. In such approach the total mass of input materials and industrial formulators composition ingredients as well as the attribution of respective environmental attribute(s) associated with input materials and industrial formulators composition ingredients are balanced.

In one embodiment the one or more environmental attribute(s) are associated with at least one property related to the environmental impact of the one or more input material(s) and/or the chemical process(s). The one or more environmental attribute(s) may specify environmental properties of the input material(s) used to produce the industrial formulators composition ingredient and/or the one or more environmental attribute(s) may specify environmental properties of the chemical process(es) used to produce the industrial formulators composition ingredient. The one or more environmental attribute(s) may be generated from environmental properties of the input material(s) used to produce the industrial formulators composition ingredient, process data associated with the chemical processing of the input material(s) and/or energy data associated with the energy consumption of the chemical processing. The one or more environmental attribute(s) may include a recycled content associated with the input material(s) and allocated or allocatable to the industrial formulators composition ingredient(s), a renewable content associated with the input material(s) and allocated or allocatable to the industrial formulators composition ingredient(s), and/or a product carbon footprint associated with the industrial formulators composition ingredient(s).

In one embodiment the production operating apparatus is configured to gather environmental attributes associated with the produced industrial formulators composition ingredient before, during and/or after production of the industrial formulators composition ingredient by the chemical production network. The environmental attributes associated with the produced industrial formulators composition ingredient may relate to input material(s). The environmental attributes associated with input materials may be provided before, during and/or after production of the industrial formulators composition ingredient by the chemical production network. The environmental attributes associated with input materials may be allocated to at least one balancing account before, during and/or after production of the industrial formulators composition ingredient by the chemical production network. The environmental attributes associated with the produced industrial formulators composition ingredient may relate to environmental properties generated from process data associated with the chemical processing of the input material(s) and/or energy data associated with the energy consumption of the chemical processing. The environmental attributes associated with the produced industrial formulators composition ingredient may be generated before, during and/or after production of the industrial formulators composition ingredient by the chemical production network. The process data associated with the chemical processing of the input material(s) and/or energy data associated with the energy consumption of the chemical processing may be gathered prior, during and/or after production of the industrial formulators composition ingredient.

In one embodiment the industrial formulators composition ingredient passport or the digital asset may include the decentral identifier associated with the industrial formulators composition ingredient and the one or more environmental attribute(s) linked to the decentral identifier. The one or more environmental attribute(s) may be linked to the decentral identifier included in the industrial formulators composition ingredient passport or the digital asset. The one or more environmental attribute(s) may be stored in a data base associated with or of the industrial formulators composition ingredient producer for access by any consumer of the industrial formulators composition ingredient. The one or more environmental attribute(s) may be stored in a data base associated with or of the industrial formulators composition ingredient producer for transfer to a consume of the industrial formulators composition ingredient e.g. when accessed or on providing the industrial formulators composition ingredient. The decentral identifier may comprise any unique identifier uniquely associated with the industrial formulators composition ingredient producer and industrial formulators composition ingredient data such as the environmental attributes. The decentral identifier may include a Universally Unique IDentifier (UUID) or a Digital IDentifier (DID). The decentral identifier may be issued by a central or decentral identity issuer. The decentral identifier may be linked to authentication and/or authorization information. Via the decentral identifier and its unique association with the industrial formulators composition ingredient producer and industrial formulators composition ingredient data, such as the environmental attributes, access to the industrial formulators composition ingredient data may be controlled by the industrial formulators composition ingredient producer. This contrasts with central authority schemes, where identifiers are provided by such central authority and access to data is controlled by such central authority. Decentral in this context refers to the usage of the identifier in implementation as controlled by the data owner, such as the industrial formulators composition ingredient producer.

The decentral identifier may be uniquely associated with the industrial formulators composition ingredient or the physical entity of the industrial formulators composition ingredient, e.g. as packaged for transportation to the consumer of the industrial formulators composition ingredient. The decentral identifier may be uniquely to the one or more environmental attribute(s). The industrial formulators composition ingredient passport or the digital asset may include one or more digital representation(s) pointing to industrial formulators composition ingredient data including the environmental attribute(s) or parts thereof including the environmental attribute(s). The digital representation may comprise at least one interface to a data providing service. It may further include at least one interface to a data consuming service. It may include an endpoint for data exchange or sharing (resource endpoint) or an endpoint for service interaction (service endpoint), that is uniquely identified via a communication protocol. The digital representation(s) pointing to industrial formulators composition ingredient data or parts thereof may be uniquely associated with the decentral identifier.

The industrial formulators composition ingredient passport or the digital asset may comprise or be connected to a digital representation of industrial formulators composition ingredient data, such as environmental attribute(s). The digital representation may include a representation for accessing the industrial formulators composition ingredient data, such as environmental attribute(s) or part thereof. The digital representation may include a representation of industrial formulators composition ingredient data, such as environmental attribute(s). The industrial formulators composition ingredient passport or the digital asset may include or be connected to data related to the industrial formulators composition ingredient data, such as environmental attribute(s), the authentication information and the decentral identifier. The data related to the industrial formulators composition ingredient data, such as environmental attribute(s), may include the digital representation of the industrial formulators composition ingredient data, such as environmental attribute(s).

BRIEF DESCRIPTION OF THE DRAWINGS

In the following, the present disclosure is further described with reference to the enclosed figures:

FIG. 1 illustrates an example of a chemical production network 102 producing one or more output material, in particular industrial formulators composition ingredient(s) 104 from one or more input material(s) 100 in connection with a production operating system 106 including an attribute management system.

Figure 1:
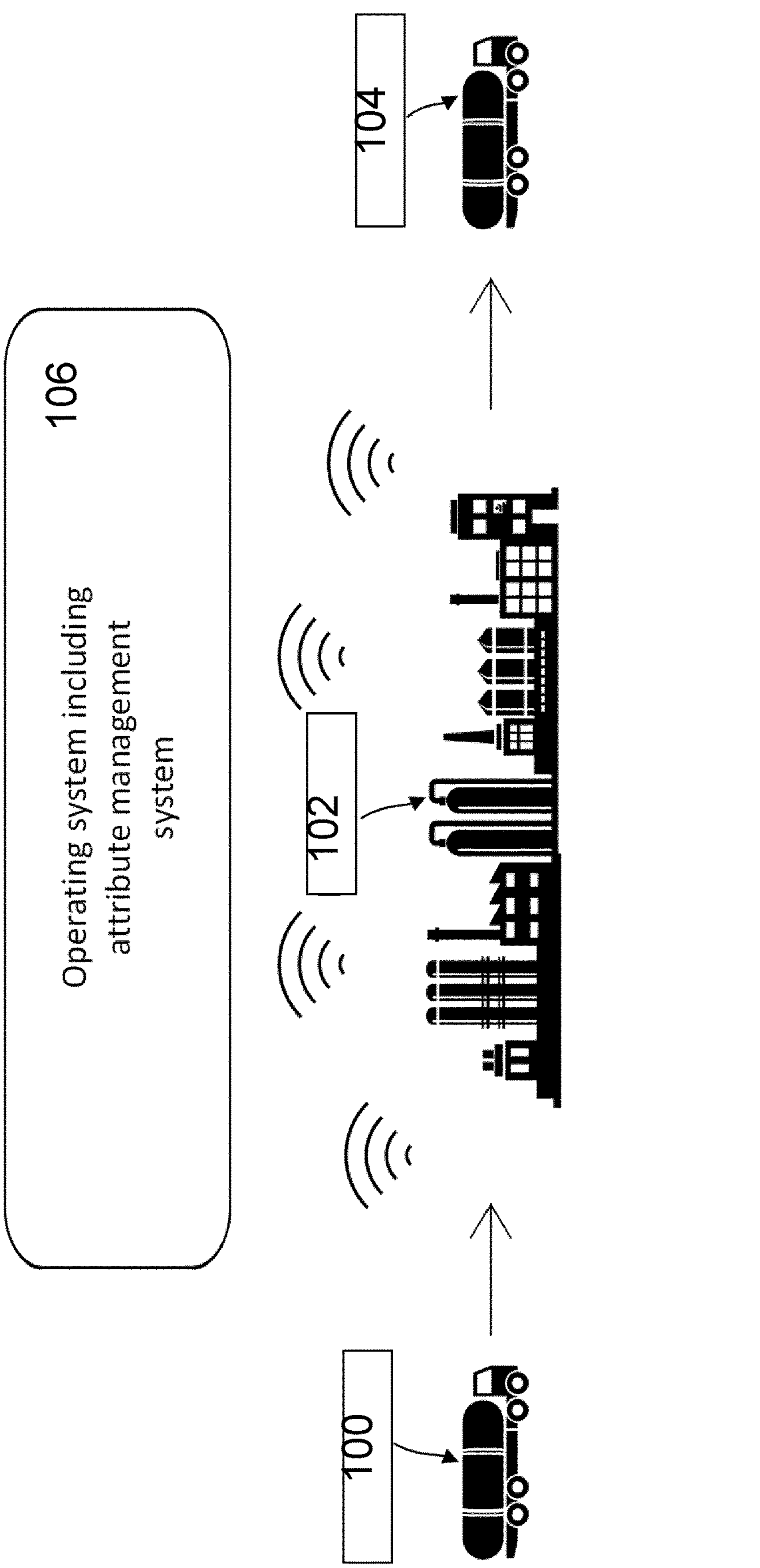
FIG. 1 illustrates schematically an example of a chemical production network producing one or more output material(s) from one or more input material(s) in connection with a production operating system including an attribute management system.

For producing one or more output material(s), in particular industrial formulators composition ingredient(s) 104 different input materials 100 may be provided as physical inputs to the chemical production network 102. The physical input material(s) 100 and output material(s), in particular industrial formulators composition ingredient(s), 104 may be associated with one or more properties related to environmental impact. The properties related to environmental impact may be digitalized in the form of environmental attributes such as recycled or bio-based content of the input materials. The production operating system 106 may be configured to ingest such environmental attributes and to track the environmental attributes across the chemical production network 102 from input materials 100 to output material(s), in particular industrial formulators composition ingredient(s), 104.

The chemical production network 102 may include multiple interlinked processing steps. The chemical production network 102 may be an integrated chemical production network 102 with interrelated production chains. The chemical production network 102 may include multiple different production chains that have at least one intermediate product in common. The chemical production network 102 may include multiple stages of the chemical value chain. The chemical production network 102 may include the producing, refining, processing and/or purification of gas or crude oil. The chemical production network 102 may include a stream cracker, or a syngas plant connected to multiple production chains that output products 104 from the effluent of such plants. The chemical production network 102 may include multiple production chains that output from one or more input material(s) 100 one or more output material(s), in particular industrial formulators composition ingredient(s), 104. The chemical production network 102 may include multiple tiers of a chemical value chain. The chemical production network 102 may include a physically interconnected arrangement of production sites. The production sites may be at the same location or at different locations. In the latter case the production sites may be interconnected by means of dedicated transportation systems such as pipelines, supply chain vehicles, like trucks, supply chain ships or other cargo transportation means.

The chemical production network 102 may chemically convert input materials 100 to one or more output material(s), in particular industrial formulators composition ingredient(s), 104. The chemical production network 102 may convert input materials 100 by way of chemical conversion to one or more output material(s), in particular industrial formulators composition ingredient(s), 104.

The input materials 100 may be fed to the chemical production network 102 at any entry point. The input materials 100 may be fed to the chemical production network 102 at the start of the chemical production network 102. Input materials 100 may for example make up the feedstock of a steam cracker. The input material 100 may include non-fossil input material, such as bio-based or recycled material, and/or fossil input material for the manufacture of chemical intermediates and chemical output material(s), in particular industrial formulators composition ingredient(s), 104.

The chemical production network 102 may include multiple production steps. The production steps included in the chemical production network 102 may be defined by the system boundary of the chemical production network 102. The system boundary may be defined by location or control over production processes. The system boundary may be defined by the site of the chemical production network 102. The system boundary may be defined by production processes controlled by one entity or multiple entities jointly. The system boundary may be defined by value chain with staggered production processes to an end product, which may be controlled by multiple entities separately. The chemical production network 102 may include a waste collection and sorting step, a recycling step such as pyrolysis, a cracking step such as steam cracking, a separation step to separate intermediates of one process step and further processing steps to convert such intermediates to output material(s), in particular industrial formulators composition ingredient(s), 104 leaving the system boundary of the chemical production network 102.

The production operating system 106 of the chemical production network 102 may be configured to monitor and/or control the chemical production network 102 based on operating parameters of the different processes. One process step monitored and/or controlled may be the feed of input materials 100 or the release of output material(s), in particular industrial formulators composition ingredient(s), 104. Another process step monitored and/or controlled may be the registration of environmental attributes associated with input materials 100 entering the system boundary of the chemical production network 102. Yet another process step monitored and/or controlled may be the attribution of environmental attributes to output material(s), in particular industrial formulators composition ingredient(s), 104 produced via the chemical production network 102. Yet another process step monitored and/or controlled may be the management of environmental attributes associated with input materials 100 and output material(s), in particular industrial formulators composition ingredient(s), 104 of the chemical production network 102.

The production operating system 106 may be configured to register inbound environmental attributes and to assign outbound environmental attributes. The production operating system 106 may be configured to access data related the inputs materials 100, the processes and/or the output material(s), in particular industrial formulators composition ingredient(s), 104 used in the chemical production network 102. For example, the production operating system 106 may be configured to register a recycled or bio-based content of the one or more input material(s) 100 used in the chemical production network 102 as environmental attribute. The production operating system 106 may be configured to allocate the environmental attribute to at least one balancing account associated with the recycled or bio-based content of the input materials 100. The production operating system 106 may be configured to allocate at least a part of the environmental attributes from the at least one balancing account to the at least one output material(s), in particular to the industrial formulators composition ingredient(s), 104.

The production operating system 102 may be configured to handle environmental attributes related to the input materials 100 and output material(s), in particular industrial formulators composition ingredient(s), 104 of the chemical production network 102. For example, the production operating system 106 may be configured to determine environmental attributes associated with the use of input materials 100 impacting the environmental property of the chemical production network 102 and the output material(s), in particular industrial formulators composition ingredient(s) 104 produced by the chemical production network 102. Further in particular, the production operating system 102 may be configured to determine environmental attributes associated with the output material(s), in particular industrial formulators composition ingredient(s) 104. This way the production operating system 102 may be configured to store environmental attributes in balancing accounts or to withdraw environmental attributes from the balancing accounts. The environmental attributes may hence be viewed as a credit that may be deposited in an account or deducted from an account related to the input and output material(s), in particular industrial formulators composition ingredient(s), of the chemical production network 102. This way the environmental impact of the production may be tracked and/or traced.

In chemical production networks 102 multiple value chains may be linked. Additionally different input materials 100 or chemical processes impacting the environmental property of output material(s), in particular industrial formulators composition ingredient(s), 104 produced by the chemical production network 102 may be used. Examples of input materials 100 impacting at least one environmental property of output material(s), in particular industrial formulators composition ingredient(s) 104 produced from such input materials 100 are recycled, renewable or bio-based input materials 104. Examples of chemical processes impacting the environmental property include chemical processes using environmentally friendly technology such as carbon capture, carbon utilization or heat pumps.

Owing to the processing of chemicals in continuous or semi-continuous production and the complexity of chemical production networks 102, traceability of the input materials through the network may be hampered. In such scenarios, an equivalent environmental attribute signifying the impact on the environmental property of output material(s), in particular industrial formulators composition ingredient(s) 104 produced by the chemical production network may be allocated to balancing accounts and assigned to one or more output material(s), in particular industrial formulators composition ingredient(s), 104 of the chemical production network 102. The environmental attributes may hence be decoupled from the physical material flow inside the chemical production network 102. Decoupling may be based on the mass balance model in that the equivalent amount assigned to the one or more output material(s), in particular industrial formulators composition ingredient(s) may not exceed the equivalent amount provided by input materials or processes. If an equivalent amount has been allocated to the virtual account of one environmental attribute type, it may not be allocated a second time to another virtual account of the one environmental attribute type. Environmental attribute types may be recycled, bio-based, renewable or the like. Environmental attributes may be provided in the form of digital assets or industrial formulators composition ingredient passports attached to the physical entity of the industrial formulators composition ingredient.

Figure 2:
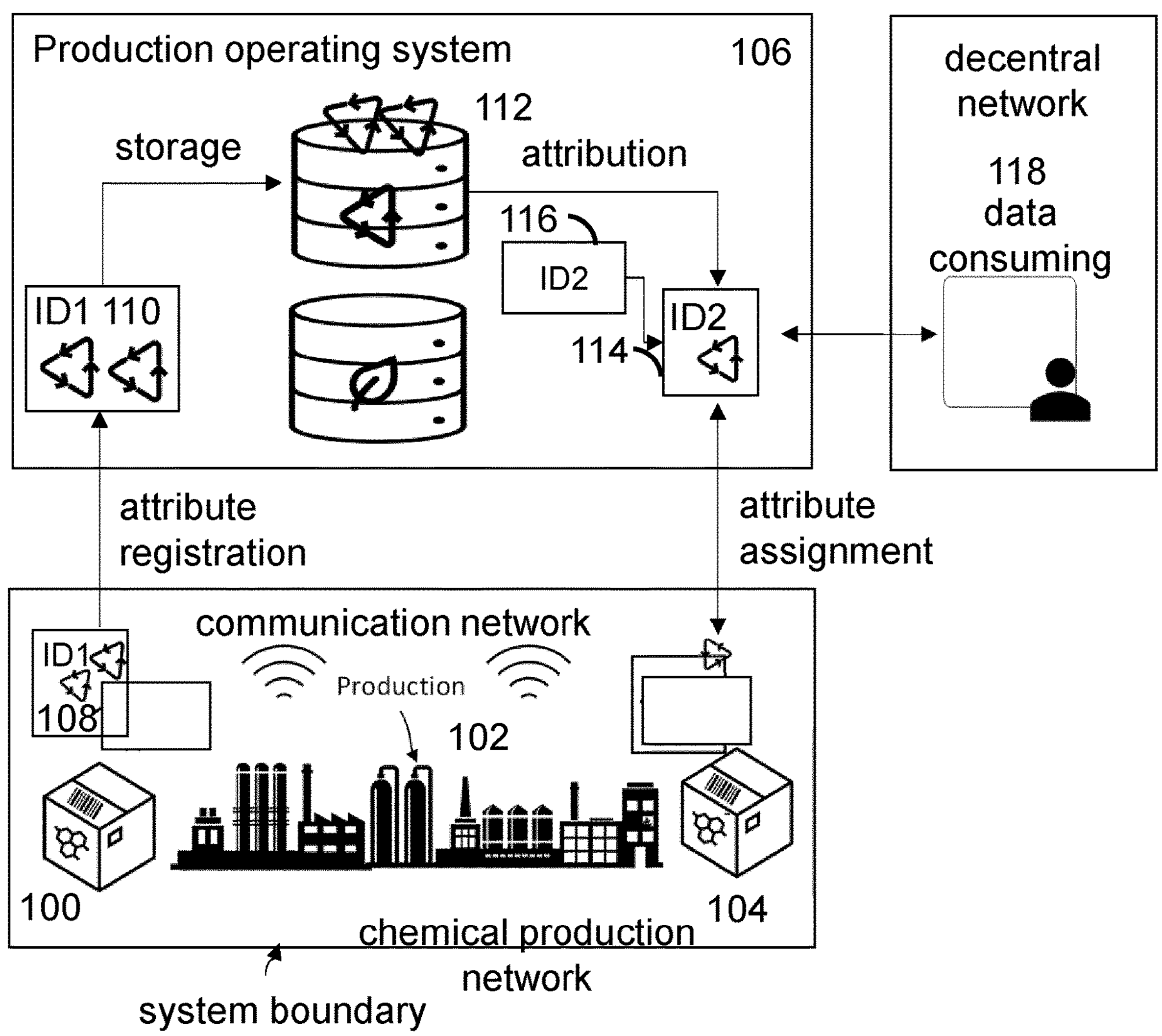
FIG. 2 illustrates schematically an example of attributing environmental attributes of input materials to output materials of the chemical production network.

FIG. 2 illustrates schematically an example of attributing environmental attributes associated with input materials 100 to output material(s), in particular industrial formulators composition ingredient(s) 104 of the chemical production network 102.

As shown in FIG. 1 the chemical production network 102 and operations of the chemical production network 102 may be monitored and/or controlled by a production operating system 106. The production operating system 106 may be configured to track environmental attributes from input materials 100 fed to the chemical production network 102 to output material(s), in particular industrial formulators composition ingredient(s), 104 produced by the chemical production network 102. For tracking the operating system 106 may be configured to register environmental attributes associated with the input materials 100 provided to the chemical production network 102 and to attribute environmental attributes to output material(s), in particular industrial formulators composition ingredient(s), 104 produced by the chemical production network 102.

The input materials 100 such as pyrolysis oil, bio-naphtha or bio-gas may be provided to the chemical production network 102. The input materials 100 may enter the chemical production network 104 at the entry point, such as a such as a steam cracker or a syngas plant. The input materials 100 may be used in the chemical production network 102 to produce one or more output material(s), in particular industrial formulators composition ingredient(s), 104 from the input materials 100, output material(s), in particular industrial formulators composition ingredient(s), 104 may be provided at exit points of the chemical production network 102. Further output material(s) may be MDI, TDI, PA6, EPS, PC, Polyols, Caprolactam, adipic acid, HMD, Polyamides.

On entry of the input material 100, input material data 108 may be provided via a communication network to a computing interface of the production operating system 106. A data provider, such as a QR code reader, may be configured to provide material data 108 related to the one or more input material(s) 100 and respective environmental attributes 108 to a computing interface configured to allocate the environmental attributes associated with the input materials 100. The material data 108 may include the input material identifier and environmental attributes associated with the input materials 100. The input material identifier may be associated with the physical entity of the input material 100 entering the chemical production network 102. The material data may be provided on, prior or after providing of the one or more input material(s) at entry points to the chemical production network 102.

The input material identifier may be linked to the environmental attribute(s) associated with the respective input material(s) 100, the amount of input material 100 and the certificate certifying the environmental attribute(s). The amount of input material may be a measured amount of input material 100 fed to a plant or storage of the chemical production network 102 for producing one or more output material(s), in particular industrial formulators composition ingredient(s) 104 from the input material(s) 100. The input material identifier associated with the respective input material 100, the environmental attribute(s) associated with the respective input material(s) 100 and the amount of input material(s) 100 provided to the chemical production network 102 may be provided to the production operating system 106. Such data may be provided via a communication network on entry to chemical production network 102, or the data may be transferred from a computing system to the production operating system 106.

An inbound allocator 110 may be configured to allocate the one or more environmental attribute(s) to at least one balancing account 112 associated with the respective environmental attribute. For example, one balancing account 112 may relate to environmental attributes from recycled material and another balancing account 112 may relate to environmental attributes from bio-based material. The balancing account may be associated with the respective environmental attribute type, such as bio-based or recycled. Based on such association the balancing account associated with the environmental attribute type of the respective input material 100 may be selected. The environmental attributes may be allocated to the selected balancing account. For example, the account 112 for recycled material may be selected and the environmental attribute may be allocated to such account 122.

To allocate, the one or more environmental attribute(s) may be converted to balancing units and the balancing units may be allocated to the balancing account 122. The conversion may be based on a conversion factor such as mass, weight, carbon atoms, hydrogen atoms, methane equivalents or any other suitable measure for quantifying the environmental impact of the environmental attribute. The conversion factor may hence take into account the difference between producing chemical products from conventional input material(s) and producing chemical products from non-conventional input material(s) or producing chemical products from a mix of conventional and non-conventional input materials. The conversion factor may relate to differences in chemical and/or physical properties of conventional and non-conventional input material(s).

By using the balancing accounts 112 it can be ensured that environmental attributes of input materials 100 are only used once for assignment to industrial formulators composition ingredients 104. This way double counting on input or output is avoided to ensure positive environmental impact can be reliable tracked and assigned to industrial formulators composition ingredients 104.

An identifier provider 116 may be configured to provide the industrial formulators composition ingredient identifier associated with the industrial formulators composition ingredient produced by the chemical production network 102 and provided at the exit point from the chemical production network 102.

An outbound assigner 114 may be configured to assign at least one environmental attribute from the at least one balancing account 112 associated with the respective environmental attribute to the industrial formulators composition ingredient identifier ID2. One or more environmental attribute(s) may be assigned to the at least one industrial formulators composition ingredient identifier ID2. Assignment may include de-allocation of the one or more environmental attributes from the balancing account 112 associated with the respective environmental attribute type. Assignment may include converting one or more balancing unit(s) to one or more environmental attribute(s).

Assigning at least one environmental attribute associated with input material(s) to industrial formulators composition ingredient(s) may include the linking of the industrial formulators composition ingredients identifier ID2 with the environmental attribute. The industrial formulators composition ingredient identifier ID2 may be associated with the physical entity of the industrial formulators composition ingredient. This way the virtual identifier of a material may be uniquely linked to the physical material. Such linking may include a physical or virtual link of identifiers uniquely associated with the physical material. For physical linking a tag or code may be physically connected to the material, e.g., by printing a QR code on the packaging. For virtual linking different identifiers associated with the physical material may be linked. For example, an order number, a batch number, LOT number or a combination thereof may be linked.

The outbound assigner 114 may be configured to provide the environmental attributes associated with the industrial formulators composition ingredient to a data consumer, such as a system associated with a user of the industrial formulators composition ingredient. The outbound assigner 114 may be configured to provide the environmental attributes associated with the industrial formulators composition ingredient to a decentral network as will be described in the example of FIG. 4. Environmental attributes may be provided via the above ID based schema in the form of digital assets or industrial formulators composition ingredient passports associated with the physical entity of the industrial formulators composition ingredient.

Figure 3:
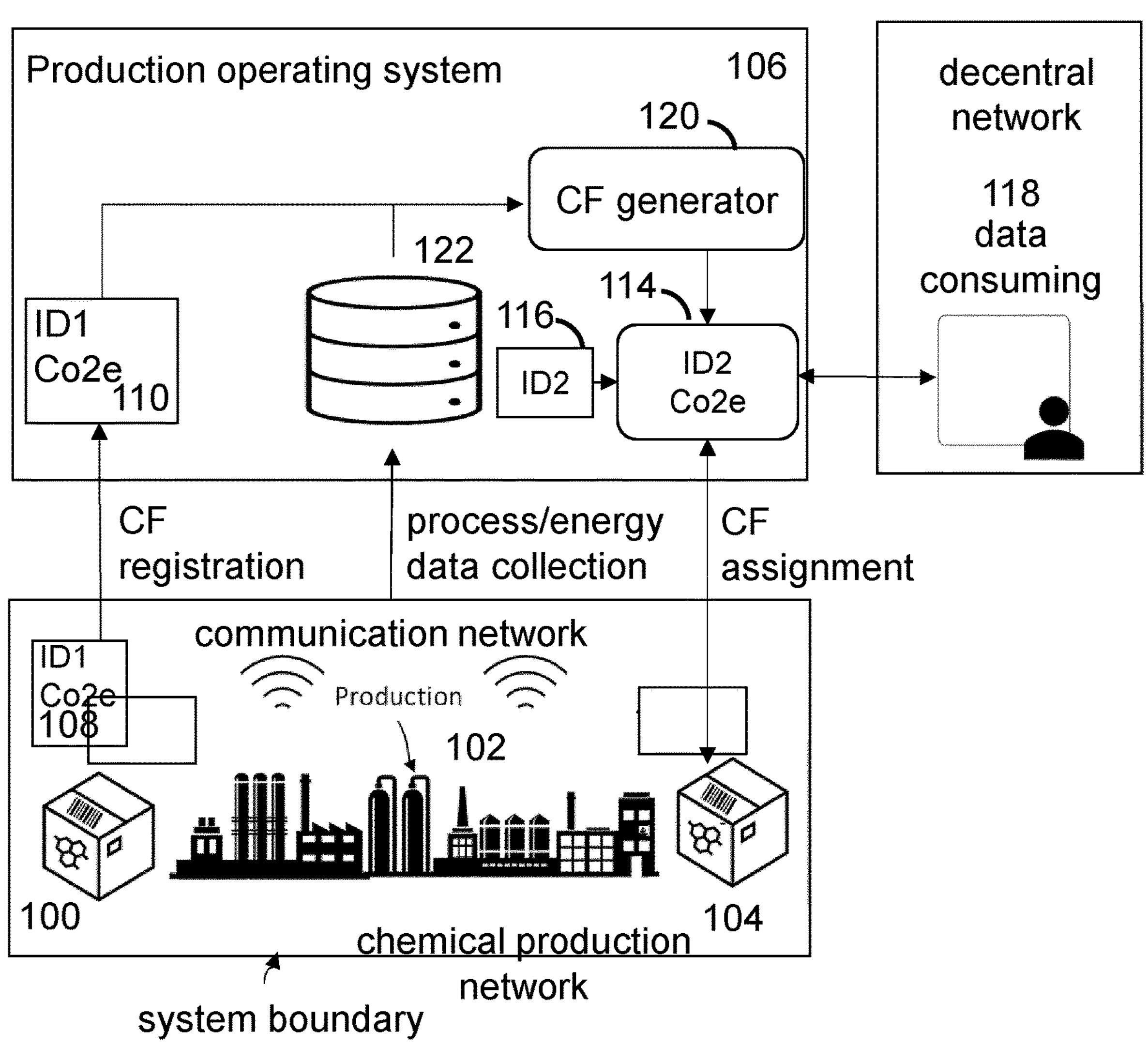
FIG. 3 illustrates schematically an example of attributing environmental attributes of input materials and chemical processes to an output material of the chemical production network.

FIG. 3 illustrates schematically an example of attributing environmental attributes of input materials 100 and chemical processes to the industrial formulators composition ingredient 104 of the chemical production network 102.

As described in the context of FIGS. 1 and 2 the chemical production network 102 and operations of the chemical production network 102 may be monitored and/or controlled by a production operating system 106. Input materials 100 such as pyrolysis oil, bio-naphtha or bio-gas may be provided to the chemical production network 102. The input materials 100 may be used in the chemical production network 102 to produce one or more industrial formulators composition ingredient(s) 104 from the input materials 100.

On entry of the input material 100, input material data 108 may be provided via a communication network to a computing interface of the production operating system 106. A data provider, such as a QR code reader, may be configured to provide material data 108 related to the one or more input material(s) 100 and respective environmental attributes 108 to a computing interface configured to allocate the environmental attributes associated with the input materials 100. The material data 108 may include the input material identifier and environmental attributes associated with the input materials 100. The input material identifier may be associated with the physical entity of the input material 100 entering the chemical production network 102. The input material identifier may be linked to the carbon footprint of the input material 100 as environmental attribute. The material data may be provided on, prior or after providing of the one or more input material(s) at entry points to the chemical production network 102.

The inbound allocator 110 may be configured to retrieve the one or more environmental attribute(s) and to provide such attributes to the carbon footprint (CF) generator 120. A process data provider 122 may be configured to gather process data associated with the chemical processing of the input material(s) 100 to produce the industrial formulators composition ingredient(s) 104. The process data provider 122 may be configured to gather energy data associated with the energy consumption of the chemical processing. The process data provider 122 may be configured to provide the process data and the energy data to the CF generator 120.

The CF generator 120 may be configured to determine the carbon footprint of the industrial formulators composition ingredient produced by the chemical production network. The carbon footprint of the of the industrial formulators composition ingredient may be determined based on the process data, the energy data and the carbon footprint of the input material(s) 100 used to produce the industrial formulators composition ingredient.

An identifier provider 116 may be configured to provide the industrial formulators composition ingredient identifier associated with the industrial formulators composition ingredient produced by the chemical production network 102 and provided at the exit point from the chemical production network 102.

An outbound assigner 114 may be configured to assign the determined carbon footprint to the industrial formulators composition ingredient identifier ID2. One or more environmental attribute(s) may be assigned to the at least one industrial formulators composition ingredient identifier ID2, such as described in the context of FIG. 2.

The outbound assigner 114 may be configured to provide the environmental attributes, in particular the carbon footprint, associated with the industrial formulators composition ingredient to a data consumer, such as a system associated with a user of the industrial formulators composition ingredient. The outbound assigner 114 may be configured to provide the environmental attributes associated with the industrial formulators composition ingredient to a decentral network as will be described in the example of FIG. 4. Environmental attributes may be provided via the above ID based schema in the form of digital assets or industrial formulators composition ingredient passports associated with the physical entity of the industrial formulators composition ingredient.

Figure 4:
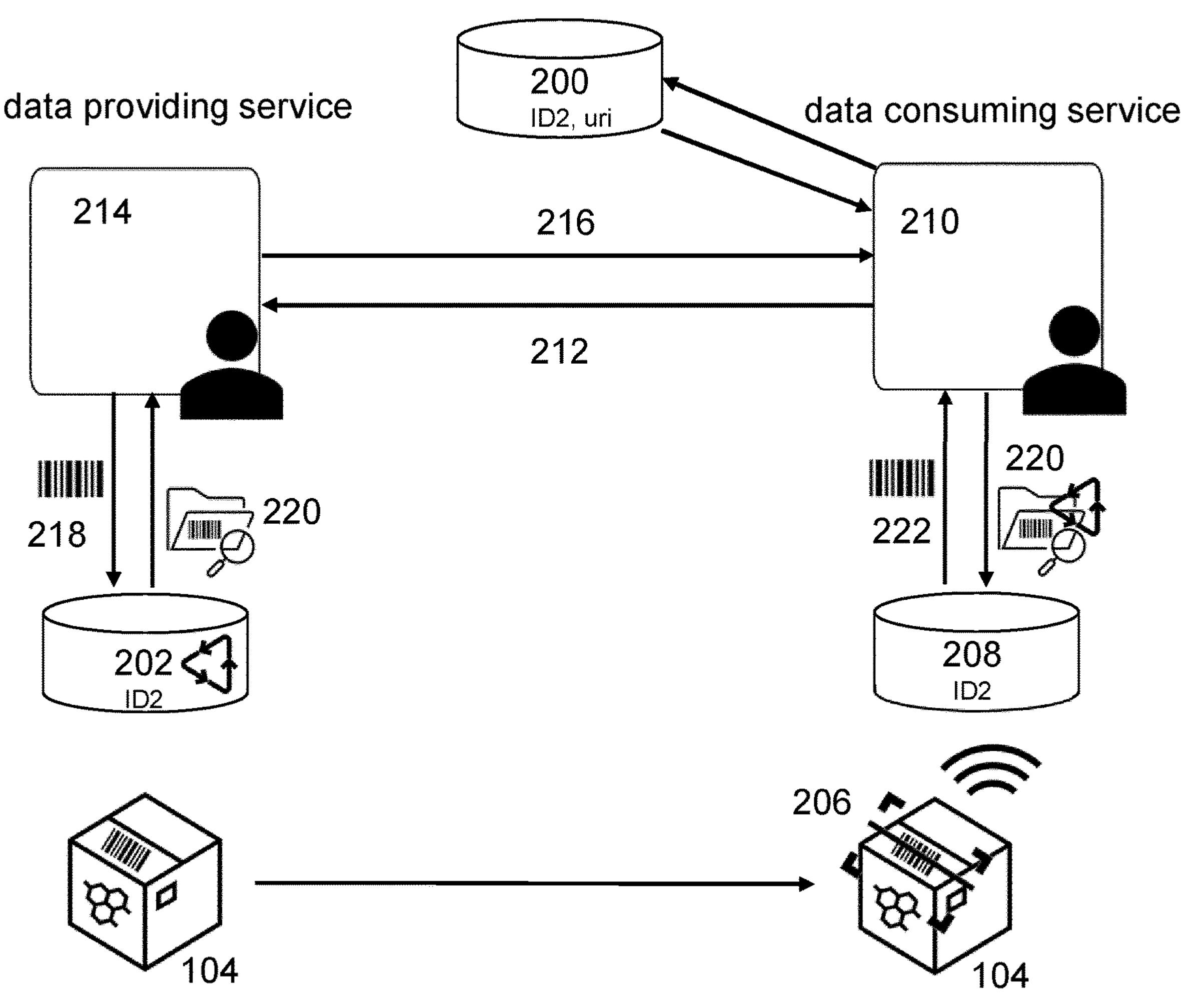
FIG. 4 illustrates schematically another example of a method or apparatus for providing environmental attributes associated with output materials to a material user as data consumer via a decentral network.

FIG. 4 illustrates schematically an example of a method or apparatus for providing environmental attributes associated with industrial formulators composition ingredients to a material user as data consumer via a decentral network.

The industrial formulators composition ingredient 104 as produced by the chemical production network 102 may be provided in association with the digital asset as described in the context of FIGS. 2 and 3. The digital asset may include the industrial formulators composition ingredient identifier. The digital asset may include one or more environmental attribute(s) such as the product carbon footprint, recycled content or bio-based content. The digital asset may relate to one or more environmental attribute(s) such as the product carbon footprint, recycled content or bio-based content. The digital asset may include a digital representation of one or more environmental attribute(s) such as the product carbon footprint, recycled content or bio-based content.

The digital asset may further include or relate to authentication and/or authorization information linked to the industrial formulators composition ingredient identifier. The authentication and/or authorization information may be provided for authentication and/or authorization of a data providing service 208 and/or data consuming service 210. The industrial formulators composition ingredient identifier may include or relate to a decentral identifier, that is uniquely associated with the industrial formulators composition ingredient. The decentral identifier may be connected to the digital representation of the environmental attributes. The digital representation may include a representation for accessing the environmental attributes or parts thereof. The decentral identifier may include a Universally Unique IDentifier (UUID) or a Digital IDentifier (DID). The decentral identifier may include any unique identifier uniquely associated with a data owner and/or industrial formulators composition ingredient. The data owner may be the producer of the industrial formulators composition ingredient. Via the decentral identifier and its unique association with the data owner and/or industrial formulators composition ingredient access to the material configuration data may be controlled by the data owner.

The digital asset including the digital representation of one or more environmental attribute(s) such as the product carbon footprint, recycled content or bio-based content may be stored in a decentral data base 200. The one or more environmental attribute(s) such as the product carbon footprint, recycled content or bio-based content may be stored in a data base 202 associated with the data owner, such as the producer of the industrial formulators composition ingredient 104.

The industrial formulators composition ingredient 104 may be physically delivered to a user of the industrial formulators composition ingredient. The industrial formulators composition ingredient may be connected with a QR-code having encoded the industrial formulators composition ingredient identifier. The user of the industrial formulators composition ingredient may read the QR-code through a QR-code reader 206. The industrial formulators composition ingredient identifier may be provided to a data base 208 associated with the consumer of the industrial formulators composition ingredient 104. In other embodiments the consumer of the industrial formulators composition ingredient may retrieve the industrial formulators composition ingredient identifier through the decentral data base 200.

The data owner in this example may be the input material producer, the output material producer, the output material user, the end product producer. The data owner may comprise any entity generating data. The data generating node may be coupled to the data owner or the entity owning or producing physical products from or for which data is generated. The data may be generated by a third-party entity on behalf of the entity owning physical products from or for which data is generated.

The data consuming service 210 may comprise computer-executable instructions for accessing and/or processing data, such as industrial formulators composition ingredient data, associated with the data owner. The data providing service 210 may comprise computer-executable instructions for providing and/or processing data, such as industrial formulators composition ingredient data, associated with the data owner for accessing and/or processing by the data consuming service 214.

Based on the received industrial formulators composition ingredient identifier a request to access the environmental attributes associated with the industrial formulators composition ingredient identifier may be triggered by the data consuming service 210 as signified by arrow 212. The industrial formulators composition ingredient identifier may be provided to the data providing service 214 associated with or of the producer of the industrial formulators composition ingredient 104. In addition, authentication and/or authorization information may be provided.

The request may be authenticated and/or authorized to access the environmental attributes associated with the industrial formulators composition ingredient identifier. Based on successful authorization and/or authentication access to the environmental attributes associated with the industrial formulators composition ingredient identifier may be granted.

For access the industrial formulators composition ingredient identifier may be provided to the data providing service 214 as signified by arrow 212. The data providing service 214 may use the received industrial formulators composition ingredient identifier to retrieve the environmental attributes associated with the industrial formulators composition ingredient 104 as signified by arrows 218 and 220. The environmental attributes associated with the industrial formulators composition ingredient 104 provided to the data providing service 214 may be provided to the data consuming service 210 as signified by arrow 216. The environmental attributes associated with the industrial formulators composition ingredient 104 may be stored in the data base 208 associated with the user of the industrial formulators composition ingredient 104 as signified by arrow 220.

Through the output identifier or decentral identifier, the environmental attributes can be uniquely associated with the industrial formulators composition ingredient. Through the decentral network the environmental attributes may be transferred between the producer of the industrial formulators composition ingredient and the user of the industrial formulators composition ingredient. This way the environmental attributes can be shared with unique association to the industrial formulators composition ingredient and without central intermediary directly between the value chain players. This allows for transparency of environmental attributes across the value chain and positive environmental impacts from industrial formulators composition ingredients produced by the chemical production network 102 can be tracked through the value chain.

Figure 5:
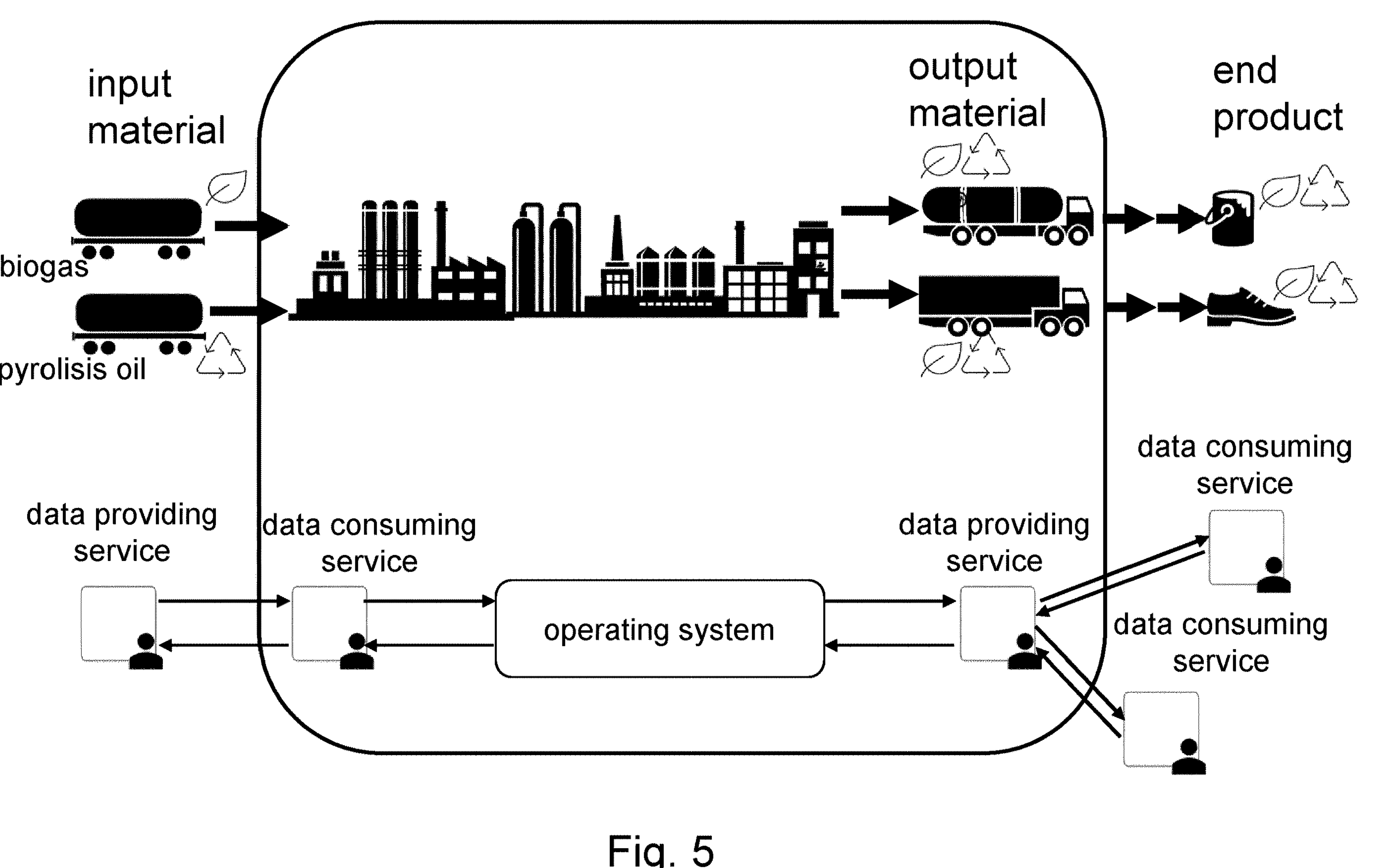
FIG. 5 illustrates schematically an example of a method or apparatus for providing environmental attributes of output materials across value chains via the decentral network.

FIG. 5 illustrates schematically an example of a method or apparatus for providing environmental attributes associated with industrial formulators composition ingredients across value chains via the decentral network.

In the example of FIG. 5 a fully connected value chain including the chemical production network is illustrated. In the example, the input material provider, the industrial formulators composition ingredient producer, the industrial formulators composition ingredient user and the end product producer may be connected to the decentral network as described in the context of FIG. 4. Environmental attributes may be provided via the ID based schema described in the context of FIGS. 2-4 in the form of digital assets or industrial formulators composition ingredient passports associated with the physical entity of the input material, the industrial formulators composition ingredient, any intermediate product or the end product.

The input material provider may provide the input materials such as bio-gas or pyrolysis oil. The environmental attributes of the input material may be provided through the data providing service connected to the decentral network as described in the context of FIG. 4. The industrial formulators composition ingredient producer may produce the industrial formulators composition ingredient from the input material(s) provided to the chemical production network. The industrial formulators composition ingredient producer may access the environmental attributes associated with the input material through a data consuming service connected to the decentral network as described in the context of FIG. 4. The industrial formulators composition ingredient producer may manage the environmental attributes via the production operating system as described in the context of FIGS. 1 to 3. The industrial formulators composition ingredient producer may assign the environmental attributes associated with the input materials or environmental attributes associated with the chemical production network such as the carbon footprint, to the industrial formulators composition ingredients as described in the context of FIGS. 1 to 3. The industrial formulators composition ingredient producer may provide the environmental attributes associated with the industrial formulators composition ingredient through the data providing service connected to the decentral network as described in the context of FIG. 4. The industrial formulators composition ingredient user or the end product producer may access the environmental attributes associated with the industrial formulators composition ingredient through the data consuming service connected to the decentral network as described in the context of FIG. 4.

The respective data owners in this example may be the input material producer, the output material producer, the output material user, the end product producer. The data owner may comprise any entity generating data. The data generating node may be coupled to the data owner or the entity owning or producing physical products from or for which data is generated. The data may be generated by a third-party entity on behalf of the entity owning physical products from or for which data is generated.

The data consuming service may comprise computer-executable instructions for accessing and/or processing data, such as industrial formulators composition ingredient data, associated with the data owner. The data providing service may comprise computer-executable instructions for providing and/or processing data, such as industrial formulators composition ingredient data, associated with the data owner for accessing and/or processing by the data consuming service.

In the example of FIG. 5 the decentral identifier may relate to the end product. Such decentral identifier may be provided to the value chain participants. Via the end product specific decentral identifier data associated with the end product produced from the industrial formulators composition ingredient may be gathered across the production chain and assigned to the end product specific decentral identifier. For example, the one or more environmental attribute(s) associated with the end product may be derived from the environmental attribute(s) associated with the industrial formulators composition ingredient, the input material or any other product entity present in the value chain of the end product.

This way the environmental attributes of input materials, industrial formulators composition ingredients and any products produced from industrial formulators composition ingredients may be tracked through the value chain up to the end product. By tracking the environmental attributes of materials in such way the information can be made transparent across the value chain while the information flow can be controlled by the participants in the supply chain. In addition, the environmental attributes can be handled according to the individual participants needs by production operating systems as described in the context of FIGS. 1 to 3. Overall, such tracking enables tracking of positive environmental impact by individual supply chain participants, which makes positive environmental impacts transparent and attributable to individual supply chain participants.

Figure 6:
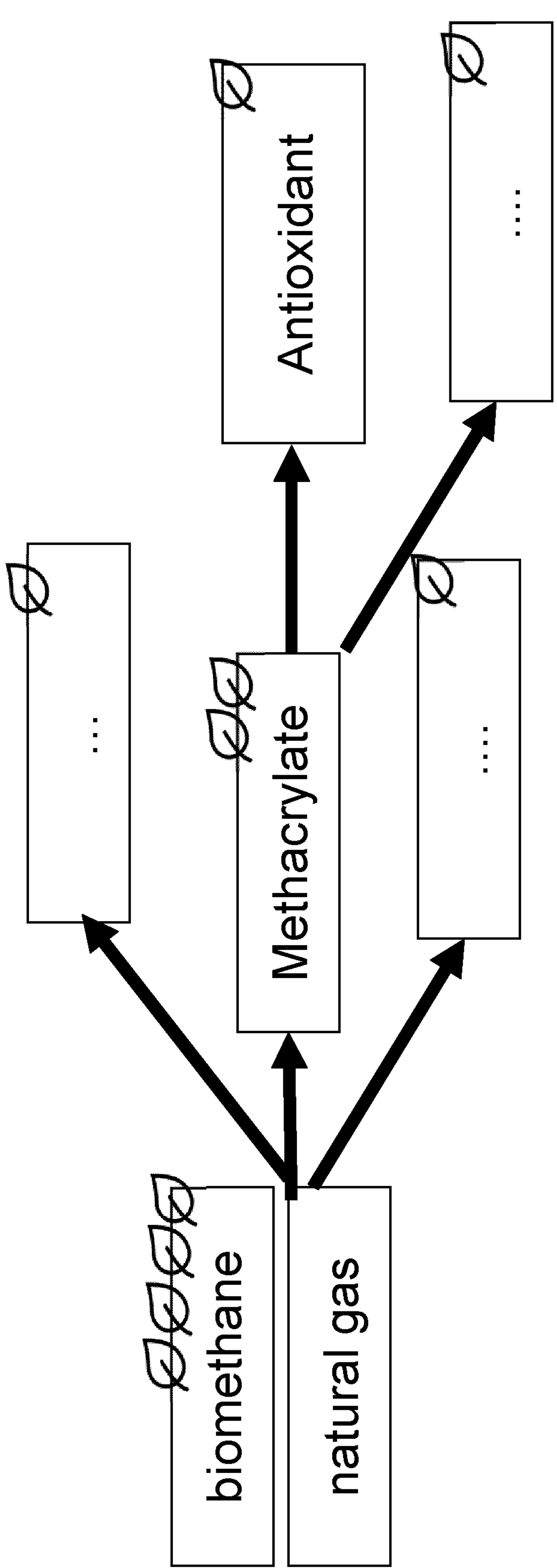
FIG. 6 illustrates schematically an example of a chemical production network for producing industrial formulators composition ingredients associated with the digital asset.

FIG. 6 illustrates schematically an example of a chemical production network for producing a industrial formulators composition ingredient associated with the digital asset. The example of FIG. 6 is an illustrative example and should not be considered limiting.

In the example of FIG. 6 acrylic acid may be provided to the chemical production network for producing a polyacrylic acid like for example a Sokalan® type (co)polymer. Acrylic acids of fossil and renewable origin may be the input materials in this example as mixed feedstock. From acrylic acid of fossil and renewable origin polyacrylic acid and other products may be produced as intermediate or output material. Out of such (meth)acrylic acid (co)polymer intermediates, modified (meth)acrylic acid (co)polymers and other products, such as intermediate materials or output materials, may be produced.

In the example of FIG. 6 the Greenhouse Gas emissions as non-fossil input material may be tracked. As described in the context of FIG. 2, the Greenhouse Gas emissions at the start of the polyacrylic acid production chain may be registered via the production operating system 106. Here the Greenhouse Gas emissions may be allocated to the balancing account 112 for acrylic acid. The environmental attribute of acrylic acid is hence detached from the mass flows of the chemical processing in the chemical production network 102 as illustrated in FIG. 6.

For attribution of the acrylic acid used to produce the polyacrylic acid, the Greenhouse Gas emissions may be determined. The Greenhouse Gas emissions attributable to polyacrylic acid production may be based on mass conservation attributable to the produced polyacrylic acid. For example, only half of the Greenhouse Gas emissions may be attributable to the polyacrylic acid and the other half may be attributable to other output products resulting from the acrylic acid as input material. The environmental attribute Greenhouse Gas emissions may be attributed to such extend to the polyacrylic acid.

In the system shown in FIG. 2, the environmental attribute associated with the production of polyacrylic acid may be attributed to the produced polyacrylic acid by associating the decentral ID to the polyacrylic acid and assigning the environmental attribute to the decentral ID. By linking the ID and the environmental attribute, the environmental attribute may be uniquely linked to the produced polyacrylic acid. The polyacrylic acid may be delivered to the polyacrylic acid user. The packaging such as lose bags with polyacrylic acid may include a QR-code. The decentral ID may be included or encoded to the QR code. This way polyacrylic acid user may access the environmental attributes associated to the polyacrylic acid via the ID based protocol described in the context of FIGS. 4 and 5.

Similarly to this example the chemical production network for producing polyacrylic acid associated with the digital asset may be based on the method illustrated in FIG. 3 for carbon footprints.

The present disclosure has been described in conjunction with preferred embodiments and examples as well. However, other variations can be understood and effected by those persons skilled in the art and practicing the claimed invention, from the studies of the drawings, this disclosure and the claims.

Any steps presented herein can be performed in any order. The methods disclosed herein are not limited to a specific order of these steps. It is also not required that the different steps are performed at a certain place or in a certain computing node of a distributed system, i.e. each of the steps may be performed at different computing nodes using different equipment/data processing.

As used herein "determining" also includes "initiating or causing to determine", "generating" also includes "initiating and/or causing to generate" and "providing" also includes "initiating or causing to determine, generate, select, send and/or receive". "Initiating or causing to perform an action" includes any processing signal that triggers a computing node or device to perform the respective action.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Any disclosure and embodiments described herein relate to the methods, the systems, devices, the computer program element lined out above and vice versa. Advantageously, the benefits provided by any of the embodiments and examples equally apply to all other embodiments and examples and vice versa.

All terms and definitions used herein are understood broadly and have their general meaning.

The invention claimed is:

1. A system for producing an industrial formulators composition ingredient associated with a digital asset, the system comprising:

a chemical production network configured to produce the industrial formulators composition ingredient wherein the industrial formulators composition ingredient is produced from one or more input materials through one or more chemical processes of the chemical production network, wherein the one or more input materials and/or the one or more chemical processes are associated with one or more environmental attributes; and a production operating apparatus configured to generate the digital asset by providing a decentral identifier associated with the produced industrial formulators composition ingredient and linking the decentral identifier to the one or more environmental attributes, wherein the decentral identifier is connected to a digital representation of the one or more environmental attributes and wherein the one or more environmental attributes are stored in a database associated with the industrial formulators composition ingredient producer for access by a consumer of the industrial formulators composition ingredient;

wherein the digital representation includes a representation for accessing the one or more environmental attributes or part thereof, wherein access to the one or more environmental attributes or part thereof is controlled by the industrial formulators composition ingredient producer via the decentral identifier and its association with the industrial formulators composition ingredient producer and the one or more environmental attributes.

2. The system of claim 1, wherein the industrial formulators composition ingredient associated with the digital asset is selected from the group consisting of macromonomers, polymers of acrylic acid and/or methacrylic acid and their alkali metal or ammonium salts, non-ionic surfactants, solvents, wetting agents, adjuvants, anionic surfactants, emulsifiers, dispersants for pigments, macromers for silicone surfactants, defoamers, adhesion promoters, processing aids, cross-linking catalysts, bleach stabilisers, retention aids, barrier coatings, binders, biocatalysts, micronutrients, cell breakers, treatment aids, mercering products, oligomeric dispersants, dye transfer inhibitors, and bleach stabilisers.

3. The system of claim 1, wherein the digital asset of the industrial formulators composition ingredient includes a mass balanced environmental attribute related to the one or more input materials.

4. The system of claim 1, wherein the one or more environmental attributes associated with the industrial formulators composition ingredient is provided from at least one balancing account configured to store the one or more environmental attributes associated with the one or more input materials, wherein the balancing account relates to a storage structure associated with an environmental attribute type, wherein the one or more environmental attributes are assigned to the decentral identifier, wherein assignment includes de-allocation of the one or more environmental attributes from the balancing account associated with the respective environmental attribute type.

5. The system of claim 1, wherein the one or more environmental attributes is associated with at least one property related to environmental impact of the one or more input materials and/or the one or more chemical processes.

6. The system of claim 1, wherein the production operating apparatus is configured to gather one or more environmental attributes associated with the produced industrial formulators composition ingredient before, during and/or after production of the industrial formulators composition ingredient by the chemical production network.

7. The system of claim 1, wherein one or more environmental attributes associated with the industrial formulators composition ingredient produced through the one or more chemical processes from the one or more input materials provided to the chemical production network includes the one or more environmental attributes associated with the one or more input materials, and/or the one or more chemical processes.

8. The system of claim 1, wherein the one or more environmental attributes associated with the one or more input materials is provided before, during and/or after production of the industrial formulators composition ingredient by the chemical production network, wherein the one or more environmental attributes associated with the one or more input materials is allocated to at least one balancing account before, during and/or after production of the industrial formulators composition ingredient by the chemical production network.

9. The system of claim 1, wherein the one or more environmental attributes associated with the produced industrial formulators composition ingredient relate to environmental properties generated from process data associated with the chemical processing of the one or more input materials and/or energy data associated with the energy consumption of the chemical processing, wherein the one or more environmental attributes associated with the produced industrial formulators composition ingredient are generated before, during and/or after production of the industrial formulators composition ingredient by the chemical production network.

10. The system of claim 1, wherein the one or more environmental attributes include a recycled content associated with the input materials and allocated or allocatable to the industrial formulators composition ingredient, a renewable content associated with the input materials and allocated or allocatable to the industrial formulators composition ingredient, and/or a product carbon footprint associated with the industrial formulators composition ingredient.

11. The system of claim 1, wherein the production operating apparatus is configured to assign the decentral identifier to physical identifier connected to the produced industrial formulators composition ingredient.

12. The system of claim 1, wherein the digital asset includes the decentral identifier associated with the industrial formulators composition ingredient and the one or more environmental attribute linked to the decentral identifier.

13. A method performed by a production operating apparatus for generating a digital asset associated with an industrial formulators composition ingredient, wherein the industrial formulators composition ingredient is produced from one or more input materials through one or more chemical processes of a chemical production network, wherein the one or more input materials and/or the one or more chemical processes are associated with one or more environmental attributes, the method comprising:

generating, by the production operating apparatus, the digital asset by providing a decentral identifier associated with the produced industrial formulators composition ingredient and the one or more environmental attributes of the one or more input materials and/or the one or more chemical processes used to produce the industrial formulators composition ingredient;

linking the decentral identifier and the one or more environmental attributes, wherein the decentral identifier is connected to a digital representation of the one or more environmental attributes and wherein the one or more environmental attributes are stored in a database associated with the industrial formulators composition ingredient producer for access by a consumer of the industrial formulators composition ingredient; and providing, by the production operating apparatus, the digital asset in association with the produced industrial formulators composition ingredient, wherein the one or more environmental attributes associated with the industrial formulators composition ingredient are made accessible to a user of the industrial formulators composition ingredient through the digital asset;

wherein the digital representation includes a representation for accessing the one or more environmental attribute or part thereof, wherein access to the one or more environmental attribute or part thereof is controlled by the industrial formulators composition ingredient producer via the decentral identifier and its association with the industrial formulators composition ingredient producer and the one or more environmental attributes.

14. An apparatus for generating a passport or digital asset associated with an industrial formulators composition ingredient, wherein the industrial formulators composition ingredient is produced from one or more input materials through one or more chemical processes of a chemical production network, wherein the one or more input materials and/or the one or more chemical processes are associated with one or more environmental attributes, the apparatus comprising:

a decentral identity provider configured to provide a decentral identifier associated with the produced industrial formulators composition ingredient and one or more environmental attributes of the one or more input materials and/or the one or more chemical processes used to produce the industrial formulators composition ingredient;

an assignor configured to link the decentral identifier and the one or more environmental attributes, wherein the decentral identifier is connected to a digital representation of the one or more environmental attributes and wherein the one or more environmental attributes are stored in a database associated with the industrial formulators composition ingredient producer for access by a consumer of the industrial formulators composition ingredient; and a passport provider configured to provide the industrial formulators composition ingredient passport or digital asset in association with the produced industrial formulators composition ingredient to a decentral network, wherein the one or more environmental attributes associated with the industrial formulators composition ingredient are made accessible to a consumer of the industrial formulators composition ingredient through the industrial formulators composition ingredient passport or digital asset;

wherein the digital representation includes a representation for accessing the one or more environmental attributes or part thereof, wherein access to the one or more environmental attributes or part thereof is controlled by the industrial formulators composition ingredient producer via the decentral identifier and its association with the industrial formulators composition ingredient producer and the one or more environmental attributes.

15. The method of claim 13 further including producing a product from the industrial formulators composition ingredient associated with the digital asset.

* * * * *